United States Patent
Yamazaki

(10) Patent No.: US 12,480,027 B2
(45) Date of Patent: Nov. 25, 2025

(54) CURABLE SILICONE COMPOSITION, CURED PRODUCT OF SAME, AND METHOD FOR PRODUCING SAME

(71) Applicant: DOW TORAY CO., LTD., Tokyo (JP)

(72) Inventor: Ryosuke Yamazaki, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 948 days.

(21) Appl. No.: 17/442,665

(22) PCT Filed: Mar. 18, 2020

(86) PCT No.: PCT/JP2020/012029
§ 371 (c)(1),
(2) Date: Sep. 24, 2021

(87) PCT Pub. No.: WO2020/203306
PCT Pub. Date: Oct. 8, 2020

(65) Prior Publication Data
US 2022/0195270 A1 Jun. 23, 2022

(30) Foreign Application Priority Data
Mar. 29, 2019 (JP) ................................. 2019-066556

(51) Int. Cl.
| | | |
|---|---|---|
| C09J 183/04 | (2006.01) |
| B29C 43/00 | (2006.01) |
| B29C 43/24 | (2006.01) |
| B29C 43/28 | (2006.01) |
| B29C 43/30 | (2006.01) |
| B29C 45/00 | (2006.01) |
| B29C 45/14 | (2006.01) |
| B29K 83/00 | (2006.01) |
| B29L 7/00 | (2006.01) |
| B29L 31/34 | (2006.01) |
| C08L 83/04 | (2006.01) |
| C09J 5/06 | (2006.01) |
| C09J 7/35 | (2018.01) |
| C09J 11/04 | (2006.01) |
| H01L 23/29 | (2006.01) |

(52) U.S. Cl.
CPC .......... C09J 183/04 (2013.01); B29C 43/003 (2013.01); B29C 43/24 (2013.01); B29C 43/28 (2013.01); B29C 43/305 (2013.01); B29C 45/0001 (2013.01); B29C 45/14336 (2013.01); C08L 83/04 (2013.01); C09J 5/06 (2013.01); C09J 7/35 (2018.01); C09J 11/04 (2013.01); B29K 2083/00 (2013.01); B29L 2007/002 (2013.01); B29L 2031/34 (2013.01); C08L 2203/20 (2013.01); C08L 2205/035 (2013.01); C09J 2203/326 (2013.01); C09J 2400/10 (2013.01); C09J 2483/00 (2013.01); H01L 23/296 (2013.01)

(58) Field of Classification Search
CPC ....................................................... C09J 183/04
See application file for complete search history.

(56) References Cited

U.S. PATENT DOCUMENTS

| | | | |
|---|---|---|---|
| 5,100,976 A | 3/1992 | Hamada et al. | |
| 5,145,886 A | 9/1992 | Oxman et al. | |
| 5,169,727 A | 12/1992 | Boardman | |
| 5,357,007 A | 10/1994 | Wengrovius et al. | |
| 5,392,592 A | 2/1995 | Bozich et al. | |
| 5,977,243 A | 11/1999 | Barthel et al. | |
| 6,177,506 B1 | 1/2001 | Takahashi et al. | |
| 6,376,569 B1 | 4/2002 | Oxman et al. | |
| 6,379,792 B1 * | 4/2002 | Isshiki | C09J 7/10 524/588 |
| 6,433,055 B1 | 8/2002 | Kleyer et al. | |
| 8,124,689 B2 | 2/2012 | Loubert et al. | |
| 8,519,063 B2 | 8/2013 | Taguchi et al. | |

(Continued)

FOREIGN PATENT DOCUMENTS

| | | |
|---|---|---|
| AU | 618818 B2 | 1/1992 |
| CN | 101151328 A | 3/2008 |

(Continued)

OTHER PUBLICATIONS

Machine translation of WO-2018030287-A1, 2024 (Year: 2024).*
Machine Translation of JP-10195085-A (Year: 2025).*
Machine assisted English translation of JPH11158379A obtained from https://worldwide.espacenet.com/patent on Nov. 9, 2023, 11 pages.
Machine assisted English translation of CN103849149A obtained from https://worldwide.espacenet.com/patent on Jan. 22, 2024, 11 pages.

(Continued)

Primary Examiner — Liam J Heincer
(74) Attorney, Agent, or Firm — WARNER NORCROSS + JUDD LLP

(57) ABSTRACT

Provided is a curable silicone composition and uses thereof. The composition has hot-melt properties, strongly adheres to poorly adhesive substrates, and is particularly superior in flexibility and toughness at high temperatures from room temperature to approximately 150° C. in cured products such as overmolding, in addition to providing a cured product that does not easily warp or become damaged even when integrally molded with a lead frame or the like. The composition comprises: (A) organopolysiloxane resin microparticles where 20 mol % or more of all siloxane units is siloxane units represented by $RSiO_{3/2}$ where R is a monovalent hydrocarbon group; (B) a silatrane derivative or a carbasilatrane derivative; (C) a curing agent; and (D) a functional inorganic filler. The content of component (D) is 50% or more by volume relative to the overall composition. The composition is solid at 25° C. and has hot-melt properties at a temperature of 200° C. or lower.

21 Claims, No Drawings

(56) References Cited

U.S. PATENT DOCUMENTS

| | | | |
|---|---|---|---|
| 9,045,641 B2 | 6/2015 | Yoshitake et al. | |
| 2002/0132891 A1 | 9/2002 | Azechi et al. | |
| 2004/0265599 A1* | 12/2004 | Ushio | H01L 24/83 257/E23.125 |
| 2006/0057779 A1 | 3/2006 | Sutoh et al. | |
| 2006/0094834 A1 | 5/2006 | Aoki et al. | |
| 2006/0270788 A1 | 11/2006 | Ozai et al. | |
| 2008/0319144 A1 | 12/2008 | Morita et al. | |
| 2009/0042043 A1 | 2/2009 | Joseph et al. | |
| 2009/0075009 A1* | 3/2009 | Fujisawa | C08L 83/04 525/100 |
| 2009/0171013 A1 | 7/2009 | Taguchi et al. | |
| 2009/0281222 A1 | 11/2009 | Nishiumi et al. | |
| 2011/0104506 A1 | 5/2011 | Behl et al. | |
| 2011/0236666 A1 | 9/2011 | Hall et al. | |
| 2012/0139131 A1 | 6/2012 | Sugo et al. | |
| 2013/0183776 A1 | 7/2013 | Kashiwagi et al. | |
| 2013/0200554 A1 | 8/2013 | Mueller | |
| 2013/0274398 A1 | 10/2013 | Shiobara et al. | |
| 2014/0296468 A1 | 10/2014 | Kownacka et al. | |
| 2014/0377570 A1 | 12/2014 | Hirai et al. | |
| 2015/0115311 A1 | 4/2015 | Yoshida et al. | |
| 2015/0124338 A1 | 5/2015 | Mayumi et al. | |
| 2015/0183960 A1* | 7/2015 | Yamazaki | C08K 7/18 524/866 |
| 2015/0315427 A1 | 11/2015 | Yoshida et al. | |
| 2015/0376482 A1 | 12/2015 | Bekemeier et al. | |
| 2016/0230005 A1 | 8/2016 | Mayumi et al. | |
| 2016/0311980 A1 | 10/2016 | Knoer | |
| 2017/0057980 A1 | 3/2017 | Boyer et al. | |
| 2017/0058103 A1* | 3/2017 | Fujisawa | C08L 83/00 |
| 2017/0092822 A1* | 3/2017 | Amako | H01L 31/18 |
| 2017/0166701 A1 | 6/2017 | Jo et al. | |
| 2017/0283613 A1 | 10/2017 | Mochizuki | |
| 2017/0355804 A1 | 12/2017 | Fujisawa et al. | |
| 2018/0105692 A1* | 4/2018 | Imaizumi | C08J 3/203 |
| 2018/0208816 A1* | 7/2018 | Yamazaki | C08L 83/00 |
| 2018/0305547 A1 | 10/2018 | Dogen et al. | |
| 2019/0169398 A1 | 6/2019 | Yamazaki | |
| 2019/0169435 A1 | 6/2019 | Yamazaki | |
| 2019/0177488 A1* | 6/2019 | Yamazaki | C08K 3/36 |
| 2019/0276684 A1* | 9/2019 | Yamazaki | C09D 183/04 |
| 2019/0367744 A1 | 12/2019 | Chevalier et al. | |
| 2020/0216671 A1 | 7/2020 | Matsuzaki et al. | |
| 2020/0224069 A1 | 7/2020 | Itoh et al. | |
| 2020/0354615 A1 | 11/2020 | Itoh et al. | |
| 2020/0392335 A1 | 12/2020 | Yamazaki | |
| 2021/0162704 A1 | 6/2021 | Sreeram et al. | |
| 2021/0179783 A1 | 6/2021 | Yoshitake | |
| 2021/0179849 A1 | 6/2021 | Yoshitake | |
| 2021/0189129 A1 | 6/2021 | Yamazaki et al. | |
| 2021/0198489 A1 | 7/2021 | Yoshitake | |
| 2021/0269691 A1 | 9/2021 | Itoh et al. | |
| 2021/0284888 A1 | 9/2021 | Itoh et al. | |
| 2021/0292607 A1 | 9/2021 | Itoh et al. | |
| 2022/0002493 A1 | 1/2022 | Sugie et al. | |
| 2022/0048230 A1* | 2/2022 | Imaizumi | B29C 48/305 |
| 2022/0064447 A1* | 3/2022 | Yamazaki | C08K 9/06 |
| 2022/0064491 A1 | 3/2022 | Yamazaki | |
| 2022/0089872 A1 | 3/2022 | Fukui et al. | |
| 2022/0169894 A1* | 6/2022 | Yamazaki | C08G 77/70 |
| 2022/0186099 A1* | 6/2022 | Yamazaki | B32B 7/06 |
| 2022/0195269 A1* | 6/2022 | Yamazaki | B29C 45/0001 |
| 2022/0340756 A1 | 10/2022 | Nishijima et al. | |
| 2022/0403114 A1 | 12/2022 | Sugie et al. | |
| 2023/0044439 A1 | 2/2023 | Yamamoto et al. | |
| 2023/0137947 A1 | 5/2023 | Yamazaki et al. | |
| 2023/0151215 A1* | 5/2023 | Yamazaki | B29C 48/40 428/220 |
| 2024/0002605 A1 | 1/2024 | Tanaka et al. | |
| 2024/0052106 A1* | 2/2024 | Yamazaki | C08G 77/12 |
| 2024/0052220 A1* | 2/2024 | Yamamoto | C08G 77/20 |

FOREIGN PATENT DOCUMENTS

| | | | |
|---|---|---|---|
| CN | 103849149 A | | 6/2014 |
| CN | 104870585 A | | 8/2015 |
| CN | 106459419 A | | 2/2017 |
| CN | 106715593 A | | 5/2017 |
| CN | 107429062 A | | 12/2017 |
| CN | 108026373 A | | 5/2018 |
| CN | 109844029 A | | 6/2019 |
| EP | 1002834 A1 | | 5/2000 |
| EP | 3954739 A1 | | 2/2022 |
| EP | 4083140 A1 | | 11/2022 |
| EP | 4130157 A1 | | 2/2023 |
| EP | 4269503 A1 | | 11/2023 |
| JP | H0275681 A | | 3/1990 |
| JP | H0625602 A | | 2/1994 |
| JP | 10195085 A | * | 7/1998 |
| JP | H11158379 A | | 6/1999 |
| JP | H11279182 A | | 10/1999 |
| JP | H11335572 A | | 12/1999 |
| JP | 2000063681 A | | 2/2000 |
| JP | 2000198929 A | | 7/2000 |
| JP | 2001019933 A | | 1/2001 |
| JP | 2002155261 A | | 5/2002 |
| JP | 2003176462 A | | 6/2003 |
| JP | 2003226812 A | | 8/2003 |
| JP | 2004043814 A | | 2/2004 |
| JP | 2004307691 A | | 11/2004 |
| JP | 2004315571 A | | 11/2004 |
| JP | 2005007331 A | | 1/2005 |
| JP | 2006188593 A | | 7/2006 |
| JP | 2006274007 A | | 10/2006 |
| JP | 2007119768 A | | 5/2007 |
| JP | 2007231039 A | | 9/2007 |
| JP | 2009503133 A | | 1/2009 |
| JP | 2009132797 A | | 6/2009 |
| JP | 2009155415 A | | 7/2009 |
| JP | 2010047646 A | | 3/2010 |
| JP | 2010047676 A | | 3/2010 |
| JP | 2010509088 A | | 3/2010 |
| JP | 2011525444 A | | 9/2011 |
| JP | 2012017427 A | | 1/2012 |
| JP | 2013076050 A | | 4/2013 |
| JP | 2013523482 A | | 6/2013 |
| JP | 2013147546 A | | 8/2013 |
| JP | 2013221075 A | | 10/2013 |
| JP | 2013221082 A | | 10/2013 |
| JP | 2013222761 A | | 10/2013 |
| JP | 2013232580 A | | 11/2013 |
| JP | 5385247 B2 | | 1/2014 |
| JP | 2014009322 A | | 1/2014 |
| JP | 2014221915 A | | 11/2014 |
| JP | 2015010132 A | | 1/2015 |
| JP | 2015110752 A | | 6/2015 |
| JP | 2015214637 A | | 12/2015 |
| JP | 2016124967 A | | 7/2016 |
| JP | 2017512224 A | | 5/2017 |
| JP | 2017101137 A | | 6/2017 |
| JP | 2017520918 A | | 7/2017 |
| JP | 2017226724 A | | 12/2017 |
| JP | 2018519369 A | | 7/2018 |
| JP | 2018177993 A | | 11/2018 |
| JP | 2019167832 A | | 10/2019 |
| JP | 2019167833 A | | 10/2019 |
| JP | 2021107149 A | | 7/2021 |
| JP | 2021108319 A | | 7/2021 |
| TW | 201439219 A | | 10/2014 |
| WO | 2006104236 A1 | | 10/2006 |
| WO | 2008056810 A1 | | 5/2008 |
| WO | 2013051600 A1 | | 4/2013 |
| WO | 2014002918 A1 | | 1/2014 |
| WO | 2014136805 A1 | | 9/2014 |
| WO | 2015056483 A1 | | 4/2015 |
| WO | 2015126780 A1 | | 8/2015 |
| WO | 2015155949 A1 | | 10/2015 |
| WO | 2016038836 A1 | | 3/2016 |
| WO | 2016103654 A1 | | 6/2016 |
| WO | 2016136243 A1 | | 9/2016 |
| WO | 2017068762 A1 | | 4/2017 |

(56) References Cited

FOREIGN PATENT DOCUMENTS

| WO | 2018028792 | A1 | 2/2018 | |
|---|---|---|---|---|
| WO | 2018030286 | A1 | 2/2018 | |
| WO | 2018030288 | A1 | 2/2018 | |
| WO | WO-2018030287 | A1 * | 2/2018 | ......... B29C 45/0001 |
| WO | 2018084012 | A1 | 5/2018 | |
| WO | 2018186161 | A1 | 10/2018 | |
| WO | 2018235491 | A1 | 12/2018 | |
| WO | 2018235492 | A1 | 12/2018 | |
| WO | 2019059351 | A1 | 3/2019 | |
| WO | 2019078140 | A1 | 4/2019 | |
| WO | 2019088067 | A1 | 5/2019 | |
| WO | 2019208756 | A1 | 10/2019 | |
| WO | 2020090797 | A | 5/2020 | |
| WO | 2020138055 | A1 | 7/2020 | |
| WO | 2020138409 | A1 | 7/2020 | |
| WO | 2020138410 | A1 | 7/2020 | |
| WO | 2020166692 | A1 | 8/2020 | |
| WO | 2020203304 | A1 | 10/2020 | |
| WO | 2020203307 | A1 | 10/2020 | |
| WO | 2021132710 | A1 | 7/2021 | |
| WO | 2021200643 | A1 | 10/2021 | |
| WO | 2022004463 | A1 | 1/2022 | |
| WO | 2022138336 | A1 | 6/2022 | |

OTHER PUBLICATIONS

Machine assisted English translation of CN106715593A obtained from https://patents.google.com/patent on Mar. 14, 2023, 26 pages.
Machine assisted English translation of JP2005007331A obtained from https://patents.google.com/patent on Mar. 14, 2023, 15 pages.
Machine assisted English translation of JP2004315571A obtained from https://patents.google.com/patent on Mar. 14, 2023, 15 pages.
Machine assisted English translation of JP2015010132A obtained from https://patents.google.com/patent on Mar. 14, 2023, 22 pages.
Machine assisted English translation of JP2004307691A obtained from https://patents.google.com/patent on Mar. 14, 2023, 11 pages.
Machine assisted English translation of JP2013222761A obtained from https://patents.google.com/patent on Mar. 15, 2023, 20 pages.
Machine assisted English translation of JP2018177993A obtained from https://patents.google.com/patent on Mar. 15, 2023, 36 pages.
International Search Report for PCT/JP2019/051394 dated Mar. 17, 2020, 2 pages.
Machine assisted English translation of WO2018235492A1 obtained from https://patents.google.com/patent on Oct. 4, 2021, 20 pages.
Machine assisted English translation of JP2016124967A obtained from https://patents.google.com/patent on Oct. 4, 2021, 18 pages.
Machine assisted English translation of WO2016038836A1 obtained from https://patents.google.com/patent on Oct. 4, 2021, 18 pages.
Machine assisted English translation of WO2013051600A1 obtained from https://patents.google.com/patent on Oct. 4, 2021, 25 pages.
Machine assisted English translation of JP2007231039A obtained from https://patents.google.com/patent on Oct. 5, 2021, 7 pages.
International Search Report for PCT/JP2019/051393 dated Mar. 17, 2020, 3 pages.
International Search Report for PCT/JP2019/051392 dated Mar. 17, 2020, 2 pages.
International Search Report for PCT/JP2019/051391 dated Mar. 13, 2020, 3 pages.
International Search Report for PCT/JP2020/012028 dated Jun. 9, 2020, 3 pages.
International Search Report for PCT/JP2020/012027 dated Jun. 9, 2020, 3 pages.
International Search Report for PCT/JP2020/012030 dated Jun. 9, 2020, 2 pages.
International Search Report (with English translation) for PCT/JP2020/049074 dated Mar. 23, 2021, 7 pages.
Machine assisted English translation of JPH0625602 obtained from https://patents.google.com/patent on Nov. 11, 2022, 6 pages.
Machine assisted English translation of JP2019167832 obtained from https://patents.google.com/patent on Nov. 11, 2022, 11 pages.
Machine assisted English translation of JP2019167833 obtained from https://patents.google.com/patent on Nov. 11, 2022, 9 pages.
International Search Report (with English translation) for PCT/JP2021/012840 dated Jun. 15, 2021, 6 pages.
English translation of International Search Report for PCT/JP2022/046146 dated Jan. 31, 2023, 2 pages.
Machine assisted English translation of JP2017101137A obtained from https://worldwide.espacenet.com/patent on Apr. 7, 2024, 18 pages.
Machine assisted English translation of JP2021108319A obtained from https://worldwide.espacenet.com/patent on Mar. 12, 2024, 73 pages.
Machine assisted English translation of WO2020138055A1 obtained from https://worldwide.espacenet.com/patent on Apr. 7, 2024, 43 pages.
International Search Report for PCT/JP2020/012029 dated Jun. 9, 2020, 3 pages.
Machine assisted English translation of JP2013221082A obtained from https://patents.google.com/patent on Oct. 27, 2021, 14 pages.
Machine assisted English translation of WO2020138410A1 obtained from https://patents.google.com/patent on Oct. 27, 2021, 19 pages.
Machine assisted English translation of WO2020138409A1 obtained from https://patents.google.com/patent on Oct. 27, 2021, 24 pages.
Machine assisted English translation of WO2018235492A1 obtained from https://patents.google.com/patent on Oct. 27, 2021, 21 pages.
Machine assisted English translation of JP11335572A obtained from https://patents.google.com/patent on Oct. 27, 2021, 7 pages.
Machine assisted English translation of JPH11279182A obtained from https://patents.google.com/patent on Oct. 27, 2021, 8 pages.
Machine assisted English translation of JP2003176462A obtained from https://patents.google.com/patent on Oct. 27, 2021, 11 pages.
Machine assisted English translation of JP2009132797A obtained from https://patents.google.com/patent on Oct. 27, 2021, 9 pages.
Machine assisted English translation of JP2012017427A obtained from https://patents.google.com/patent on Oct. 27, 2021, 13 pages.
Machine assisted English translation of JP2000063681A obtained from https://patents.google.com/patent on Oct. 28, 2021, 8 pages.
English translation of International Search Report for PCT/JP2019/042320 dated Mar. 24, 2020, 2 pages.
Machine assisted English translation of JP2010047676A obtained from https://patents.google.com/patent on Jul. 21, 2021, 9 pages.
Machine assisted English translation of JP2015214637A obtained from https://patents.google.com/patent on Jul. 21, 2021, 11 pages.
Machine assisted English translation of JP2017101137A obtained from https://patents.google.com/patent on Jul. 21, 2021, 11 pages.
English translation of International Search Report for PCT/JP2021/046092 dated Feb. 8, 2022, 2 pages.
English translation of International Search Report for PCT/JP2021/046093 dated Mar. 15, 2022, 2 pages.
Dowsiltm EA-4600 Silicone Adhesive Application Guide for PCT Device Assemblies (Dow Toray Co., Ltd. publication, Form No. 1-3497-42-1120 S2D, 2020).
Machine assisted English translation of WO2019208756A1 obtained from https://worldwide.espacenet.com/patent on Dec. 21, 2023, 32 pages.
Machine assisted English translation of JP2017226724A obtained from https://patents.google.com/patent on Aug. 14, 2024, 14 pages.
Machine assisted English translation of JP2003226812A obtained from https://patents.google. com/patent on Aug. 14, 2024, 11 pages.
Machine assisted English translation of JP2010047646A obtained from https://patents.google.com/patent on Aug. 14, 2024, 9 pages.
Machine assisted English translation of JP2014221915A obtained from <https://patents.google.com/patent> on Nov. 20, 2024, 17 pages.

* cited by examiner

CURABLE SILICONE COMPOSITION, CURED PRODUCT OF SAME, AND METHOD FOR PRODUCING SAME

CROSS-REFERENCE TO RELATED APPLICATIONS

This application is the U.S. National Stage of International Application No. PCT/JP2020/012029 filed on 18 Mar. 2020, which claims priority to and all advantages of Japanese Application No. 2019-066556 filed on 29 Mar. 2019, the content of which is incorporated herein by reference.

TECHNICAL FIELD

The present invention relates to a curable silicone composition which takes the form of a granule, pellet, or sheet and which can be obtained by a simple manufacturing method, has hot-melt properties, and strongly adheres to poorly adhesive substrates. Further, the present invention relates to a cured product using the silicone composition, a molding method for the cured product, and a semiconductor device provided with the cured product.

BACKGROUND ART

Curable silicone compositions are utilized in a wide range of industrial fields because they are cured to form cured products having excellent heat resistance, cold resistance, electrical insulation, weather resistance, water repellency, and transparency. In general, the cured product of such a curable silicone composition is also suitable as an encapsulant for optical materials and semiconductor devices because it is not readily discolored compared with other organic materials and there is less deterioration of physical properties. On the other hand, in recent years, hot-melt curable silicone compositions have been widely used as sealing agents for optical materials and semiconductor devices.

In the semiconductor device industry in recent years, it has become a trend to use as a substrate nickel and gold, which are adhesion-poor materials, so there is a demand for properties in a material having excellent heat resistance and low linear expansion coefficient used to seal a device and strongly adheres to these substrates. The present inventors proposed in Patent Documents 1 and 2 a hot-melt curable silicone composition for molding having a low linear expansion coefficient of the obtained cured product. Unfortunately, because these compositions are compositions containing a large amount of functional inorganic fillers, they may have difficulties adhering to an adhesion-poor substrate such as gold or nickel, leaving room for improvement.

On the other hand, Patent Document 3 reports improvement in adhesion during low temperature curing by adding a silatrane derivative to a silicone-based adhesive not having hot-melt properties. Moreover, although an adhesive composition is disclosed in the examples of Patent Document 4 in which a silane-based adhesion promoter containing a silatrane derivative is added to a hot-melt silicone not containing a functional inorganic filler, there is no description nor suggestion regarding the superiority of the silatrane derivative when comparing the general silane compound with the silatrane derivative.

RELATED ART DOCUMENTS

Patent Documents

Patent Document 1: WO 2018/030288
Patent Document 2: WO 2018/235491
Patent Document 3: Japanese Unexamined Patent Application Publication No. 2001-19933
Patent Document 4: Japanese Unexamined Patent Application Publication No. 2006-274007 (Japanese Patent No. 4849814)

SUMMARY OF THE INVENTION

Problem to be Solved by the Invention

An object of the present invention is to provide a curable silicone composition which has hot-melt properties, exhibits excellent melt properties, handling workability, and curing characteristics, and strongly adheres to an adhesion-poor material, with an ability to form a cured product having a low linear expansion coefficient even when containing a large amount of a functional inorganic filler. An additional object of the present invention is to provide a method for efficiently manufacturing such a curable silicone composition in the form of granules, pellets, or sheets. Furthermore, the present invention provides a semiconductor device member composed of such a curable silicone composition, a semiconductor device having the cured product, and a molding method of the cured product.

Means for Solving the Problem

As a result of extensive research, the present inventors have found that the above-mentioned problems can be solved by a curable silicone composition, containing:
  (A) organopolysiloxane resin microparticles containing 20 mol % or more of siloxane units represented by $SiO_{3/2}$ in all siloxane units;
  (B) one or more adhesion promoter selected from a silatrane derivative and a carbasilatrane derivative;
  (C) a curing agent; and
  (D) a functional inorganic filler; wherein:
  a content of component (D) is 50% or more by volume relative to the overall composition, and
  the composition is solid at 25° C. and has hot-melt properties at a temperature of 200° C. or lower, leading to the present invention. Note that the curable silicone composition as described above may be in the form of pellets or sheets.

Further, the curable silicone composition as described above may be in the form of granules, pellets, or sheets.

The above-mentioned curable silicone composition may be a curable silicone composition sheet which is substantially flat and has a thickness of 10 to 1000 μm.

Moreover, the abovementioned curable silicone composition can be used in a releasable laminate having the following configuration. That is, it may be in the form of a releasable laminate which includes: a curable silicone composition sheet as described above; and a sheet-form substrate equipped with a release surface facing the curable silicone composition sheet, on one side or both sides of the curable silicone composition sheet. Such a curable silicone composition sheet may be used as a film-form or sheet-form silicone adhesive.

The curable silicone composition of the present invention can be used in the form of a cured product and can be used as a member for a semiconductor device.

The curable granular silicone composition of the present invention and the cured product thereof can be used in semiconductor devices, and a power semiconductor device, an optical semiconductor device, and a semiconductor device mounted on a flexible circuit base, in which an encapsulant, a light reflecting material, and the like that are formed by that cured product, are provided. In particular, the curable silicone composition of the present invention has superior gap-filling properties when melted, while the cured product thereof has superior flexibility and toughness at room temperature to high temperatures. Therefore, semiconductor devices in which semiconductor elements are encapsulated in a single package by so-called mold underfill or wafer molding, and post-encapsulation semiconductor element substrates in which semiconductor elements are encapsulated by the cured product on a flexible circuit board where deformation (bending, etc.) is presupposed as a manner of use, are suitably provided with the use of curable silicone composition of the present invention.

The method of molding the curable silicone composition of the present invention includes at least the following steps:
  (I) a step of heating the curable silicone composition in the form of pellets or sheets to a temperature of 100° C. or higher to melt;
  (II) a step of injecting the curable silicone composition obtained in step (I) into a mold or a step of distributing the curable silicone composition obtained in step (I) into a mold by clamping; and
  (III) a step of curing the curable silicone composition injected in step (II).

Note that the molding method described above includes transfer molding, compression molding, or injection molding, and the curable silicone composition of the present invention is suitably used as a material for the molding thereof. Furthermore, the curable silicone composition of the present invention is suitable for the so-called mold underfill method, which is a coating process in which overmolding and underfilling of a semiconductor device as represented by a power semiconductor are simultaneously performed by the cured product, or for wafer-molding process, which is an overmolding process covering the surface of a semiconductor wafer substrate equipped with semiconductor elements as well as filling the gaps between such semiconductor elements that allows a relatively large wafer, for example, 8 inches or 12 inches to be sealed all at once.

In particular, the curable silicone composition of the present invention, especially the curable silicone compositions which is in a pellet or sheet form, can be suitably used for the application with exposure to high temperatures, such as the encapsulation of power semiconductors. Moreover, the composition can also be used for the large-area encapsulation of semiconductor substrates (including wafers).

Similarly, the present inventors provide a method for manufacturing a curable silicone composition sheet, including the steps of:
  step 1: a step of mixing raw material components of the curable silicone composition at a temperature of 50° C. or higher;
  step 2: a step of kneading the mixture obtained in step 1 while heat-melting;
  step 3: a step of laminating the heat-melted mixture obtained by step 2 between two films, each equipped with at least one release surface; and
  step 4: a step of extending the laminate obtained by step 3 between rollers to forming a curable silicone sheet having a specific film thickness.

Effects of the Invention

The curable silicone composition according to the present invention has hot-melt properties and excellent handling workability and curing properties, strongly adheres to an adhesion-poor substrate, and forms a cured product having a low linear expansion coefficient. In addition, such curable silicone composition can be produced using only simple mixing processes and can be efficiently manufactured. In addition, the cured product of the present invention is useful as a member of a semiconductor device, and by using the molding method of the present invention, these cured products can be efficiently produced in accordance with applications.

DESCRIPTION OF THE PREFERRED EMBODIMENT

[Curable Silicone Composition]

The curable silicone composition of the present invention comprises:
  (A) an organopolysiloxane resin microparticles containing 20 mol % or more of siloxane units represented by $RSiO_{3/2}$ (wherein, R is a monovalent hydrocarbon group) relative to all siloxane units in the resin microparticles;
  (B) one or more adhesion promoter selected from a silatrane derivative and a carbasilatrane derivative;
  (C) a curing agent; and
  (D) a functional inorganic filler; wherein:
  the content of component (D) is 50% or more by volume relative to the overall composition, and
  the composition is solid at 25° C. and has hot-melt properties at a temperature of 200° C. or lower. In the present invention, unless otherwise stated, "having hot-melt properties" means having a softening point of 50° C. or higher, and, at 150° C., having melt viscosity (suitably, a melt viscosity of less than 1,000 Pa-s) and having flowing properties. Meanwhile, if the softening point is 200° C. or higher, it is defined as "does not have hot-melt properties" because it is above the general operating temperature for molding applications.

Hereinafter, each component and optional component of the composition will be described. In the present invention, unless otherwise defined, the term "average particle diameter" means the average particle diameter of the primary particles.

Component (A) is a main agent of the present composition and is a component for providing hot-melt properties to the present composition. Moreover, because it has a curable group containing a carbon-carbon double bond, it is cured by the curing agent that is component (C). Exemplary curing reactions include hydrosilylation reactions, radical reactions, etc. Moreover, component (A) needs to be in the form of organopolysiloxane resin microparticles in order to have hot-melt properties and for blending 50% or more by volume of component (D) with respect to the overall composition.

Examples of the hydrosilylation reactive group in component (A) include an alkenyl group having 2 to 20 carbon atoms such as vinyl, allyl, butenyl, pentenyl, hexenyl, heptenyl, octenyl, nonenyl, decenyl, undecenyl, and dodecenyl groups, and a silicon atom-bonded hydrogen atom. As the hydrosilylation reactive group, an alkenyl group is preferable. The alkenyl group may be linear or branched and is preferably a vinyl group or a hexenyl group. Component (A) preferably has at least two hydrosilylation reactive groups in one molecule.

Examples of the group bonded to a silicon atom other than the hydrosilylation reactive group in component (A) include an alkyl group having 1 to 20 carbon atoms, a halogen-substituted alkyl group having 1 to 20 carbon atoms, an aryl group having 6 to 20 carbon atoms, a halogen-substituted aryl group having 6 to 20 carbon atoms, an aralkyl group having 7 to 20 carbon atoms, an alkoxy group, and a hydroxyl group. Specific examples thereof include: alkyl groups such as methyl, ethyl, propyl, butyl, pentyl, hexyl, heptyl, octyl, nonyl, decyl, undecyl, and dodecyl groups; aryl groups such as phenyl, tolyl, xylyl, naphthyl, anthracenyl, phenanthryl, and pyrenyl groups; aralkyl groups such as phenethyl and phenylpropyl groups; groups in which a part or all of the hydrogen atoms bonded to these groups are substituted with a halogen atom such as a chlorine atom and a bromine atom; and alkoxy groups such as methoxy, ethoxy, and propoxy groups. In particular, a phenyl group and a hydroxyl group are preferable.

Examples of radical reactive groups in component (A) include: alkyl groups having 1 to 20 carbon atoms, such as methyl, ethyl, propyl, butyl, pentyl, hexyl, heptyl, octyl, nonyl, decyl, undecyl, and dodecyl groups; alkenyl groups having 2 to 20 carbon atoms, such as vinyl, allyl, butenyl, pentenyl, hexenyl, heptenyl, octenyl, nonenyl, decenyl, undecenyl, and dodecenyl group; acryl-containing groups such as 3-acryloxypropyl and 4-acryloxybutyl groups; methacryl-containing groups such as 3-methacryloxypropyl and 4-methacryloxybutyl groups; and a silicon atom-bonded hydrogen atom. As the radical reactive group, an alkenyl group is preferable. The alkenyl group may be linear or branched and is preferably a vinyl group or a hexenyl group. Component (A) preferably has at least two radical reactive groups in one molecule.

Examples of the group bonded to a silicon atom other than the radical reactive group in component (A) include a halogen-substituted alkyl group having 1 to 20 carbon atoms, an aryl group having 6 to 20 carbon atoms, a halogen-substituted aryl group having 6 to 20 carbon atoms, an aralkyl group having 7 to 20 carbon atoms, an alkoxy group, and a hydroxyl group, with the same groups as those described above exemplified. In particular, a phenyl group and a hydroxyl group are preferable. In particular, in component (A), it is preferable that 10 mol % or more of the total organic groups per molecule be an aryl group, in particular, a phenyl group.

In the present invention, component (A) is organopolysiloxane resin microparticles having a curing reactive functional group preferably containing at least one carbon-carbon double bond. The organopolysiloxane resin microparticles may be hot-meltable as a whole molecule, or may include organopolysiloxane resin microparticles that are not hot-meltable as a whole molecule.

That is, at least some or all of component (A) is preferably
(A1) hot-melt organopolysiloxane resin microparticles which have a softening point of 30° C. or higher, having at least one curing reactive functional group containing a carbon-carbon double bond per molecule, and containing 20 mol % or more of siloxane units represented by $RSiO_{3/2}$ (wherein, R is a monovalent hydrocarbon group) relative to all siloxane units. These components are described hereinafter.

[Component (A1)]

Component (A1) has hot-melt properties on its own and has at least one curing reactive functional group containing a carbon-carbon double bond per molecule, such that it is cured by the (C) curing agent described below. Such component (A1) is preferably organopolysiloxane resin microparticles consisting of:
(A1) a resinous organopolysiloxane;
(A2) an organopolysiloxane crosslinked product obtained by crosslinking at least one type of organopolysiloxane;
(A3) a block copolymer consisting of a resinous organosiloxane block and a chain-form organosiloxane block; or
a mixture of at least two of these.

Component (A1) is a resinous organopolysiloxane having a carbon-carbon double bond group (hydrosilylation reactive group and/or radical reactive group) and is preferably a hot-melt resinous organopolysiloxane having 20 mol % or more of siloxane units represented by $RSiO_{3/2}$ (wherein, R is a monovalent hydrocarbon group) relative to all siloxane units in the resinous organopolysiloxane, and having an aryl group.

Examples of such component (A1) suitably include MT resins, MDT resins, MTQ resins, MDTQ resins, TD resins, TQ resins, and TDQ resins consisting of any combination of: a triorganosiloxane unit (M unit) (the organo groups are methyl groups only, or methyl groups and a vinyl group or a phenyl group); a diorganosiloxane unit (D unit) (the organo groups are methyl groups only, or a methyl group and a vinyl group or a phenyl group); a monoorganosiloxane unit (T unit) (the organo group is a methyl group, a vinyl group, or a phenyl group); and a siloxy unit (Q unit), wherein the content of T units is 20 mol % or more of all siloxane units. Note that component (A1) preferably has at least two carbon-carbon double bond groups (hydrosilylation reactive groups and/or radical reactive groups) per molecule, and 10 mol % or more of the total organic groups per molecule is aryl groups, particularly, phenyl groups.

Preferably, component (A1) includes the following:
$(ViMe_2SiO_{1/2})_{0.25}(PhSiO_{3/2})_{0.75}(HO_{1/2})_{0.02}$
$(ViMe_2SiO_{1/2})_{0.25}(PhSiO_{3/2})_{0.75}$
$(ViMe_2SiO_{1/2})_{0.20}(PhSiO_{3/2})_{0.80}$
$(ViMe_2SiO_{1/2})_{0.15}(PhSiO_{3/2})_{0.85}(HO_{1/2})_{0.01}$
$(Me_2SiO_{2/2})_{0.15}(MeViSiO_{2/2})_{0.10}(PhSiO_{3/2})_{0.75}(HO_{1/2})_{0.04}$
$(MeViPhSiO_{1/2})_{0.20}(PhSiO_{3/2})_{0.80}(HO_{1/2})_{0.05}$
$(ViMe_2SiO_{1/2})_{0.15}(PhSiO_{3/2})_{0.75}(SiO_{4/2})_{0.10}(HO_{1/2})_{0.02}$
$(Ph_2SiO_{2/2})_{0.25}(MeViSiO_{2/2})_{0.30}(PhSiO_{3/2})_{0.45}(HO_{1/2})_{0.04}$
$(Me_3SiO_{1/2})_{0.20}(ViMePhSiO_{1/2})_{0.40}(SiO_{4/2})_{0.40}(HO_{1/2})_{0.08}$ Component (A1) preferably exhibits hot-melt properties, specifically, is non-fluid at 25° C. and preferably has a melt viscosity of 8,000 Pa s or less at 100° C. Non-fluid means not flowing in a no-load state, indicating, for example, being in the state at a temperature lower than the softening point measured by the softening point testing method in the ball and ring method of hot-melt adhesives specified in "Testing methods for the softening point of hot-melt adhesives" of JIS K 6863-1994. That is, in order to be non-fluid at 25° C., the softening point must be higher than 25° C.

Component (A1) preferably has a melt viscosity at 100° C. of 8,000 Pa s or less, 5,000 Pa s or less, or within the range of 10 to 3,000 Pa s. Moreover, when the melt viscosity at 100° C. is within the abovementioned range, favorable adhesiveness after being hot-melted and then cooled at 25° C. is obtained.

As long as component (A1) is in the form of microparticulates, the particle diameter is not limited, but the average primary particle diameter is preferably within the range of 1 to 5,000 μm, within the range of 1 to 500 μm, within the range of 1 to 100 μm, within the range of 1 to 20 μm, or within the range of 1 to 10 μm. The average primary particle diameter can be obtained, for example, by observation with an optical microscope or an SEM (scanning electron microscopy). The shape of component (A1) is not limited, with examples including a spherical shape, a spindle shape, a plate shape, a needle shape, and an irregular shape, with a spherical shape or a true spherical shape preferable for uniform melting. In particular, by making component (A1) a spherical shape of 1 to 10 μm, the melting properties and the mechanical properties after curing of this compound can be favorably improved.

The method for manufacturing component (A1) is not limited, with known methods can be used. For example, component (A1) is simply microparticulated; alternatively, the process for crosslinking at least two kinds of organopolysiloxanes and the process for microparticulating the reactants can be performed simultaneously or separately. In obtaining the microparticle component (A1), some of the components (C) described below, such as, for example, a hydrosilylation reaction catalyst, may be microparticulated together with component (A1), which is preferred.

As a method for microparticulating the obtained organopolysiloxane after crosslinking at least two types of organopolysiloxanes, for example, a method of pulverizing the organopolysiloxane using a pulverizer or a method of directly pulverizing the silicone in the presence of a solvent can be cited. While not limited thereto, the pulverizer may be, for example, a roll mill, a ball mill, a jet mill, a turbo mill, or a planetary mill. As a method of directly microparticulating the silicone in the presence of a solvent, for example, spraying by a spray dryer, or atomization by a biaxial kneader or a belt dryer can be cited. In the present invention, the use of spherical hot-meltable organopolysiloxane resin microparticles obtained by spraying with a spray dryer is particularly preferable in terms of the melting characteristics of the granular compound, the flexibility of the cured product, the compounded amount of component (B), the efficiency during manufacture, and the workability of the composition.

By using a spray dryer or the like, component (A1) having a true spherical shape and an average primary particle diameter of 1 to 500 μm can be produced. The heating and drying temperature of the spray dryer needs to be appropriately set based on the heat resistance and the like of the organopolysiloxane resin microparticles. In order to prevent secondary aggregation of the organopolysiloxane resin microparticles, the temperature of the organopolysiloxane resin microparticles is preferably controlled below the glass transition temperature thereof. The organopolysiloxane resin microparticles thus obtained can be recovered by a cyclone, a bag filter, or the like.

In order to obtain a uniform component (A1), a solvent may be used in the abovementioned step within a range that does not inhibit the curing reaction. Exemplary solvents include, but are not limited to: aliphatic hydrocarbons such as n-hexane, cyclohexane, and n-heptane; aromatic hydrocarbons such as toluene, xylene, and mesitylene; ethers such as tetrahydrofuran and dipropyl ether; silicones such as hexamethyldisiloxane, octamethyltrisiloxane, and decamethyltetrasiloxane; esters such as ethyl acetate, butyl acetate, and propylene glycol monomethyl ether; and ketones such as acetone, methyl ethyl ketone, and methyl isobutyl ketone.

[Component (B)]

Component (B) is an adhesion promoter which is characteristic of the present invention, and is one or more components selected from a silatrane derivative and a carbasilatrane derivative. The component can dramatically improve the curing adhesion to a specifically adhesion-poor substrate in the present composition.

A silatrane derivative is disclosed in Patent Document 3 (JP 2001-019933 A) described above, which is a silatrane derivative represented by the following structural formula (1):

[Formula 1]

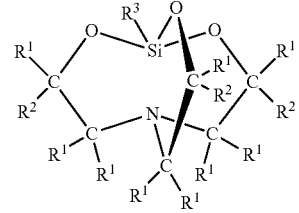

(1)

wherein $R^1$ is the same or different hydrogen atom or alkyl group, and $R^2$ is the same or different group selected from a hydrogen atom, an alkyl group, and an alkoxysilyl group-containing organic group represented by the general formula 2:

$$-R^4-Si(OR^5)_xR^6_{(3-x)}$$ [Formula 2]

wherein, $R^4$ is a divalent organic group, $R^5$ is an alkyl group having 1 to 10 carbon atoms, $R^6$ is a substituted or unsubstituted monovalent hydrocarbon group, and x is 1, 2, or 3, provided that at least one $R^2$ is this alkoxysilyl group-containing organic group, $R^3$ is a group selected from a substituted or unsubstituted monovalent hydrocarbon group, an alkoxy group having 1 to 10 carbon atoms, a glycidoxyalkyl group, an oxiranylalkyl group, an acyloxyalkyl groups, and an alkenyl group;

In Formula 1, $R^1$ is the same or different hydrogen atom or alkyl group, with $R^1$ particularly preferably being a hydrogen atom or a methyl group. Moreover, $R^2$ in the above formula is the same or different group selected from the group consisting of a hydrogen atom, an alkyl group, and an alkoxysilyl group-containing organic group represented by general formula 2: $-R^4-Si(OR^5)_xSi^6_{(3-x)}$, provided that at least one $R^2$ is an alkoxysilyl group-containing organic group of formula 2. Exemplary alkyl groups of $R^2$ include methyl groups. Moreover, in the alkoxysilyl group-containing organic group of $R^2$, $R^4$ in formula 2 is a divalent organic group, with examples thereof including an alkylene group or an alkylene oxyalkylene group, wherein an ethylene group, a propylene group, a butylene group, a methylene oxypropylene group, or a methylene oxypentylene group is preferable. Moreover, $R^5$ in formula 2 is an alkyl group having 1 to 10 carbon atoms, preferably a methyl group or an ethyl group. Moreover, $R^6$ in formula 2 is a substituted or unsubstituted monovalent hydrocarbon group, preferably a methyl group. Moreover, in the formula, x is 1, 2, or 3, preferably 3.

Exemplary alkoxysilyl group-containing organic groups of $R^2$ include the following groups.

—$(CH_2)_2Si(OCH_3)_3$—$(CH_2)_2Si(OCH_3)_2CH_3$
—$(CH_2)_3Si(OC_2H_5)_3$—$(CH_2)_3Si(OC_2H_5)(CH_3)_2$
—$CH_2O(CH_2)_3Si(OCH_3)_3$
—$CH_2O(CH_2)_3Si(OC_2H_5)_3$
—$CH_2O(CH_2)_3Si(OCH_3)_2CH_3$
—$CH_2O(CH_2)_3Si(OC_2H_5)_2CH_3$
—$CH_2OCH_2Si(OCH_3)_3$—$CH_2OCH_2Si(OCH_3)(CH_3)_2$ $R^3$ in the above formula 1 is at least one group selected from the group consisting of a substituted or unsubstituted monovalent hydrocarbon group, an alkoxy group having 1 to 10 carbon atoms, a glycidoxyalkyl group, an oxiranylalkyl group, and an acyloxyalkyl group, with exemplary monovalent hydrocarbon groups of $R^3$ including alkyl groups such as methyl groups, exemplary alkoxy groups of $R^3$ including methoxy groups, ethoxy groups, and propoxy groups, exemplary glycidoxypropyl groups of $R^3$ including 3-glycidoxypropyl groups, exemplary oxiranylalkyl groups of $R^3$ including 4-oxiranylbutyl group and 8-oxiraniloctyl groups, and exemplary acyloxyalkyl groups of $R^3$ including acetoxypropyl groups and 3-methacryloxypropyl groups. In particular, $R^3$ is preferably an alkyl group, an alkenyl group, or an alkoxy group, further preferably an alkyl group or an alkenyl group, with particularly suitable examples thereof including a group selected from a methyl group, vinyl group, allyl group, and hexenyl group.

Exemplary such silatrane derivatives include the following compounds.

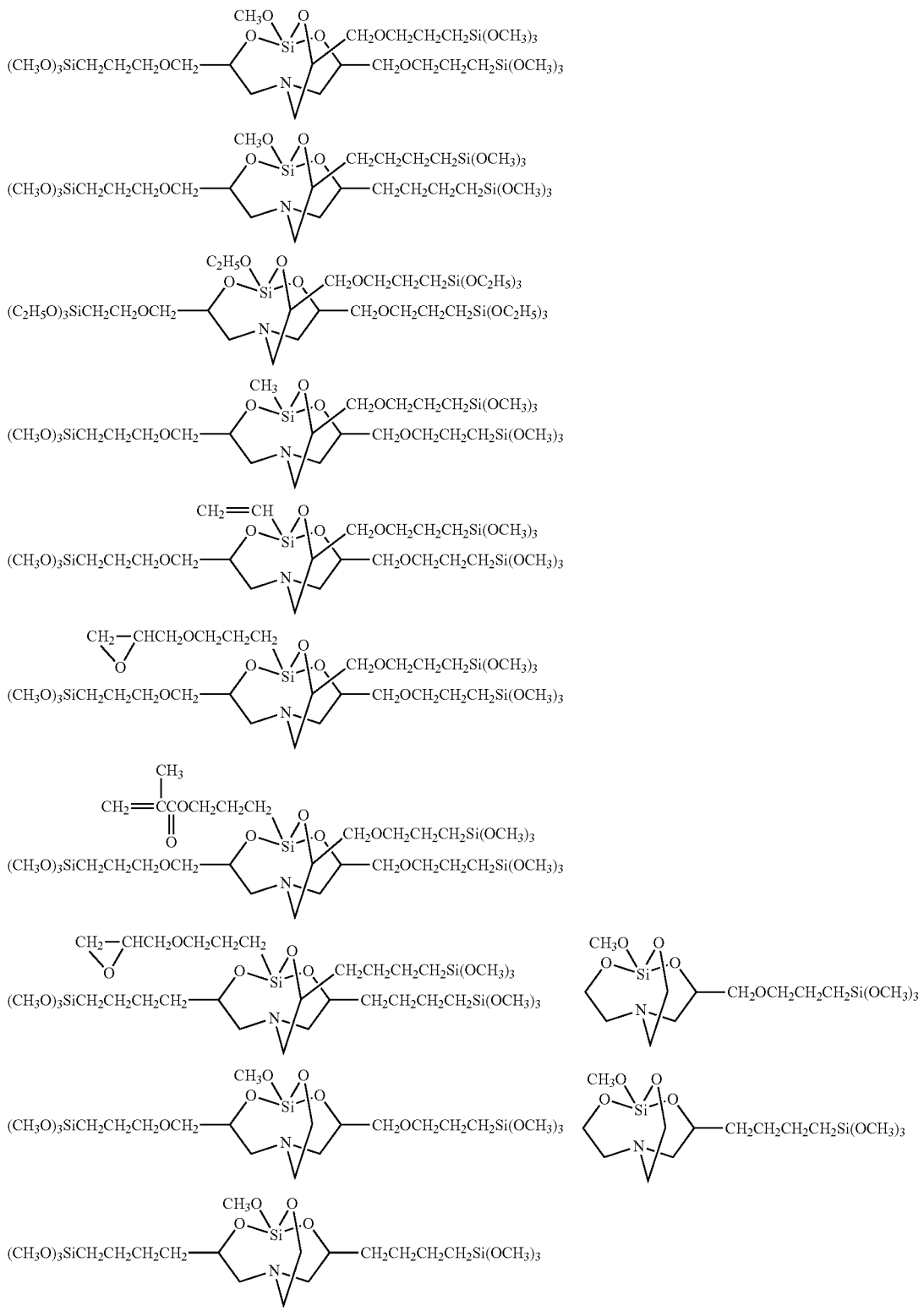

-continued
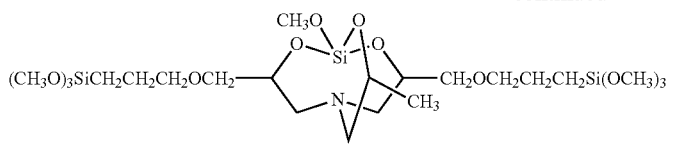
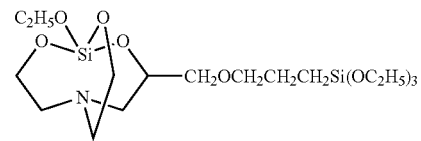
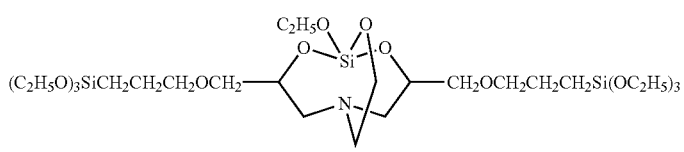
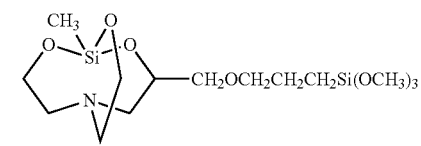
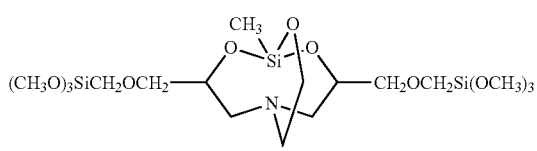
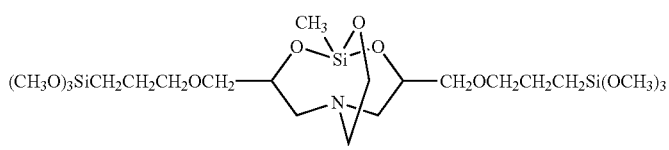
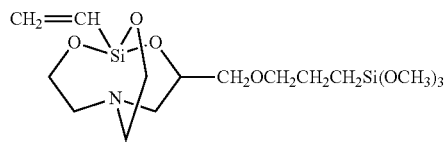
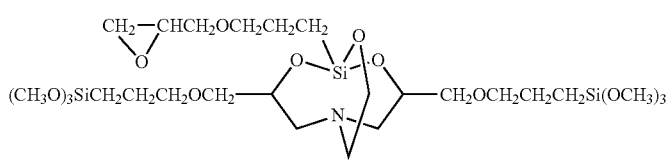
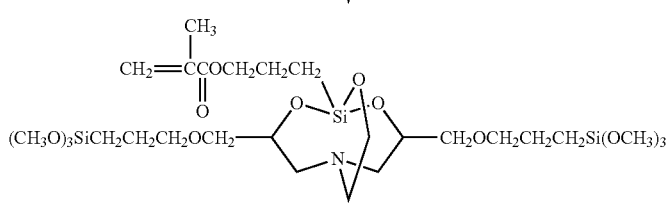
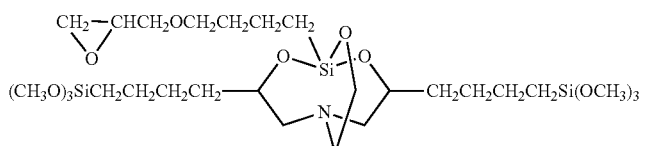
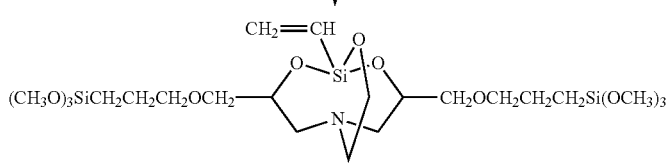
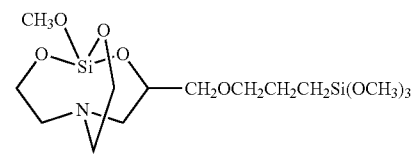
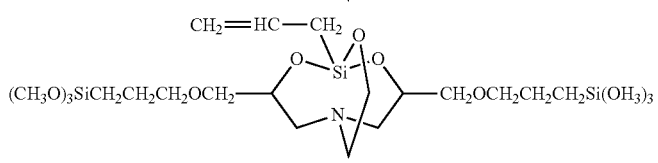
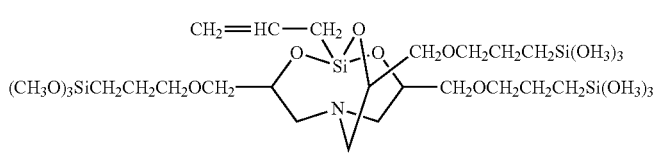

A carbasilatrane derivative is generated by the method described in JP H10-195085A, wherein an alkoxysilane having an amino group-containing organic group is reacted with an alkoxysilane having an epoxy group-containing organic group, and in particular by cyclization through alcohol replacement reaction and represented by the general formula:

[Formula 3]

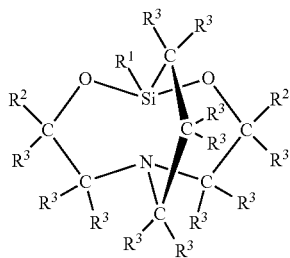

wherein $R^1$ is an alkyl group, an alkenyl group, or an alkoxy group, and $R^2$ is the same or different group selected from the group consisting of groups represented by the general formula:

[Formula 4]

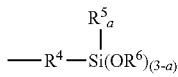

where $R^4$ is an alkylene group or alkyleneoxyalkylene group, $R^5$ is a monovalent hydrocarbon group, $R^6$ is an alkyl group, and a is 0, 1, or 2; or $$-R^7-O-R^8 \quad \text{[Formula 5]}$$

wherein $R^7$ is an alkylene group, $R^8$ is an alkyl group, alkenyl group, or acyl group; and $R^3$ is the same or different hydrogen atom or alkyl group.

Exemplary carbasilatrane derivatives may include a silatrane derivative having a silicon atom-bonded alkoxy group or a silicon atom-bonded alkenyl group per molecule represented by the following structure:

[Formula 6]

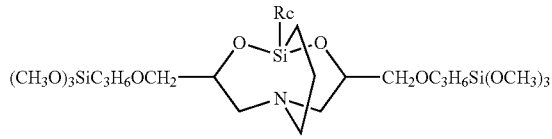

wherein Rc is a group selected from a methoxy group, ethoxy group, vinyl group, allyl group, and hexenyl group.

While the amount of component (B) to be used is not particularly limited, in terms of improving adhesion to an adhesion-poor substrate, the amount is suitably within a range of 0.1 to 1.0 mass % relative to the composition as a whole, and more preferably within a range of 0.2 to 1.0 mass % thereof. Moreover, the blending amount of component (B) may be within a range of 5 to 50 parts by mass, or within a range of 5 to 40 parts by mass, relative to 100 parts by mass of component (A).

[Component (C)] Component (C) is a curing agent for curing component (A) and is not limited as long as it can cure component (A). When component (A) has an alkenyl group, component (C) is an organohydrogenpolysiloxane having at least two silicon atom-bonded hydrogen atoms in one molecule and a hydrosilylation reaction catalyst, while when component (A) contains an alkenyl group and contains a hydrosilylation reaction catalyst, component (C) may be only an organopolysiloxane having at least two silicon atom-bonded hydrogen atoms in one molecule, although a hydrosilylation reaction catalyst may be used in combination. In addition, when component (A) has an alkenyl group, component (C) may be an organic peroxide, although an organopolysiloxane having at least two silicon atom-bonded hydrogen atoms in one molecule may be used in combination. Meanwhile, when component (A) has a silicon atom-bonded hydrogen atom, component (C) may be an organopolysiloxane having at least two alkenyl groups in one molecule and a hydrosilylation reaction catalyst, while when component (A) has a silicon atom-bonded hydrogen atom and contains a hydrosilylation reaction catalyst, component (C) may be only an organopolysiloxane having at least two alkenyl groups in one molecule, although a hydrosilylation reaction catalyst may be used in combination.

When an organopolysiloxane is used as component (C), while the amount thereof is not limited, for curing the composition, it is preferable that the amount of silicon atom-bonded hydrogen atoms be within the range of 0.5 to 20 mol or within the range of 1.0 to 10 mol relative to 1 mol of alkenyl group in the composition.

As the hydrosilylation reaction catalyst, platinum-based catalysts, rhodium-based catalysts, and palladium-based catalysts are exemplified, with platinum-based catalysts being preferable because curing of the present composition can be remarkably accelerated. Exemplary platinum-based catalysts include platinum fine powder, chloroplatinic acid, an alcohol solution of chloroplatinic acid, a platinum-alkenyl siloxane complex, a platinum-olefin complex, a platinum-carbonyl complex, and a catalyst in which these platinum-based catalysts are dispersed or encapsulated with a thermoplastic resin such as silicone resin, polycarbonate resin, acrylic resin, or the like, with a platinum-alkenyl siloxane complex particularly preferable. Exemplary alkenylsiloxanes include: 1,3-divinyl-1,1,3,3-tetramethyldisiloxane; 1,3,5,7-tetramethyl-1,3,5,7-tetravinylcyclotetrasiloxane; alkenyl siloxanes obtained by substituting a portion of methyl groups of the alkenylsiloxanes with an ethyl group, a phenyl group, or the like; and alkenylsiloxanes obtained by substituting a portion of vinyl groups of these alkenylsiloxanes with an allyl group, a hexenyl group, or the like. In particular, 1,3-divinyl-1,1,3,3-tetramethyldisiloxane is preferable because the platinum-alkenyl siloxane complex has good stability. In addition, in terms of improving the handleability as well as the pot life of the composition, a platinum containing hydrosilylation reaction catalyst in microparticles dispersed and encapsulated with thermoplastic resin may be used. As the catalyst for promoting the hydrosilylation reaction, a non-platinum based metal catalyst such as iron, ruthenium, iron/cobalt, or the like may be used.

The amount of the hydrosilylation reaction catalyst to be added is preferably an amount in which the metal atom is within the range of 0.01 to 500 ppm, an amount within the range of 0.01 to 100 ppm, or an amount within the range of 0.01 to 50 ppm in terms of mass units with regard to component (A).

Examples of organic peroxides include alkyl peroxides, diacyl peroxides, ester peroxides, and carbonate peroxides.

Examples of alkyl peroxides include dicumyl peroxide, di-tert-butyl peroxide, di-tert-butylcumyl peroxide, 2,5-dimethyl-2,5-di(tert-butylperoxy)hexane, 2,5-dimethyl-2,5-di(tert-butylperoxy)hexyne-3, tert-butylcumyl, 1,3-bis(tert-butylperoxyisopropyl)benzene, and 3,6,9-triethyl-3,6,9-trimethyl-1,4,7-triperoxonan.

Examples of diacyl peroxides include benzoyl peroxide, lauroyl peroxide, and decanoyl peroxide.

Examples of ester peroxides include 1,1,3,3-tetramethylbutylperoxyneodecanoate, α-cumylperoxyneodecanoate, tert-butylperoxyneodecanoate, tert-butylperoxyneoheptanoate, tert-butylperoxypivalate, tert-hexylperoxypivalate, 1,1,3,3-tetramethylbutylperoxy-2-ethylhexanoate, tert-amylperoxyl-2-ethylhexanoate, tert-butylperoxy-2-ethylhexanoate, tert-butylperoxyisobutyrate, di-tert-butylperoxyhexahydroterephthalate, tert-amylperoxy-3,5,5-trimethylhexanoate, tert-butylperoxy-3,5,5-trimethylhexanoate, tert-butylperoxyacetate, tert-butylperoxybenzoate, and di-butylperoxytrimethyladipate.

Examples of carbonate peroxides include di-3-methoxybutyl peroxydicarbonate, di(2-ethylhexyl)peroxydicarbonate, diisopropyl peroxycarbonate, tert-butyl peroxyisopropylcarbonate, di(4-tert-butylcyclohexyl)peroxydicarbonate, dicetyl peroxydicarbonate, and dimyristyl peroxydicarbonate.

This organic peroxide preferably has a 10-hour half-life temperature of no lower than 90° C. or no lower than 95° C. Examples of such organic peroxide include dicumyl peroxide, di-tert-butyl peroxide, di-tert-hexyl peroxide, tert-butylcumyl peroxide, 2,5-dimethyl-2,5-di(tert-butylperoxy)hexane, 1,3-bis(tert-butylperoxyisopropyl)benzene, di-(2-tert-butylperoxyisopropyl)benzene, and 3,6,9-triethyl-3,6,9-trimethyl-1,4,7-triperoxonan.

While not limited thereto, the content of organic peroxide is preferably within the range of 0.05 to 10 parts by mass, or within the range of 0.10 to 5.0 parts by mass, relative to 100 parts by mass of component (A).

[Component (D)]

Component (D) of the present invention is an inorganic filler that enables the provision of a curable silicone composition which cures to give a cured product with excellent hardness and toughness from room temperature to high temperatures. In the present invention, in terms of achieving a low average linear expansion coefficient for the obtained cured product, the amount of component (B) must be 50% or more by volume of the overall composition and is preferably 60% or more by volume, more preferably 70% or more by volume, and particularly preferably within a range of 80 to 95 volume % of the overall composition.

In order to achieve the aforementioned compounded amount and to achieve a low average linear expansion coefficient for the obtained cured product, component (D) is preferably treated with a specific surface treatment agent—in particular, a surface treatment agent at 0.1 to 2.0 mass %, 0.1 to 1.0 mass %, or 0.2 to 0.8 mass % relative to the mass of the entire component (D). Treating component (D) with a surface treatment agent in the treatment amount described above is advantageous in that component (D) can be stably compounded in the composition at a high volume %. The surface treatment method is at one's choice, with a desired method being a uniform mixing method using mechanical force (dry), a wet mixing method using a solvent, and such.

Examples of these surface treatment agents include methylhydrogenpolysiloxane, silicone resins, metal soaps, silane coupling agents, and fluorine compounds such as perfluoroalkylsilane and perfluoroalkylphosphate ester salts; however, the silicone-based surface treatment agents described below are particularly preferable. Note that when a silane-based surface treatment agent such as methyltrimethoxysilane or phenyltrimethoxysilane is selected as the surface treatment agent of component (D), the hot-melt properties of the overall composition may be diminished, so component (D) may not be stably compounded to the amount indicated by the volume % described above. Moreover, when an alkyltrialkoxysilane having a long-chain alkyl group such as an octyl group is selected as a surface treatment agent, it tends to enable maintaining the hot-melt properties of the composition and the compounding stability of component (D); however, the strength of the cured product obtained by curing the composition of the present invention may be negatively affected, potentially causing cracking or molding defects.

In contrast, the silatrane derivative and the carbasilatrane derivative, which are component (B), have alkoxy groups as these silane compounds do, but even when these are mixed in with the surface treatment agent described here, there is advantageously no effect of deteriorating the melt characteristics of the composition or the strength of the cured product, causing no adverse effects.

Here, exemplary organic silicon compounds as surface treatment agents include low molecular weight organic silicon compounds such as silanes, silazanes, siloxanes, and the like, along with organic silicon polymers or oligomers such as polysiloxanes, polycarbosiloxanes, and the like. A so-called silane coupling agent is an example of a preferred silane. Typical examples of the silane coupling agents include alkyltrialkoxysilanes (such as methyltrimethoxysilane, vinyltrimethoxysilane, hexyltrimethoxysilane, octyltrimethoxysilane, decyltrimethoxysilane, and the like) and trialkoxysilanes containing an organic functional group (such as glycidoxypropyltrimethoxysilane, epoxycyclohexyl ethyltrimethoxysilane, methacryloxypropyltrimethoxysilane, aminopropyltrimethoxysilane, and the like).

Preferred siloxanes and polysiloxanes include hexamethyldisiloxanes, 1,3-dihexyl-tetramethyldisiloxanes, trialkoxysilyl single-terminated polydimethylsiloxanes, trialkoxysilyl single-terminated dimethylvinyl single-terminated polydimethylsiloxanes, trialkoxysilyl single-terminated organic functional group single-terminated polydimethylsiloxanes, trialkoxysilyl doubly-terminated polydimethylsiloxanes, organic functional group doubly-terminated polydimethylsiloxanes, and the like. When a siloxane is used, the number of siloxane bonds "n" is preferably within a range of 2 to 150. Examples of preferred silazanes include hexamethyldisilazanes, 1,3-dihexyl-tetramethyldisilazanes, and the like. An example of a preferred polycarbosiloxane is a polymer having an Si—C—C—Si bond in a polymer main chain.

An example of a particularly suitable silicone-based surface treatment agent is a silicone-based surface treatment agent having at least one polysiloxane structure and a hydrolyzable silyl group per molecule. Most suitably, it is preferable to use a silicone-based surface treatment agent having at least one polysiloxane structure and a hydrolyzable silyl group per molecule, with examples thereof including organopolysiloxanes having a straight-chain alkoxysilyl terminal represented by structural formula (7):

or structural formula (8):

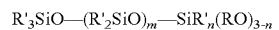

In the formulae, R is a hydrogen atom or an alkyl group having 1 to 3 carbon atoms (=a methyl group, an ethyl group, or a propyl group), while each R' is independently an alkyl group having 1 to 20 carbon atoms, a halogen-substituted alkyl group having 1 to 20 carbon atoms, an alkenyl group having 2 to 20 carbon atoms, an aryl group having 6 to 20 carbon atoms, a halogen-substituted aryl group having 6 to 20 carbon atoms, or an aralkyl group having 7 to 20 carbon atoms, with the same groups as those described above exemplified. n is a number in the range of 0 to 2, while m is a number in the range of 2 to 200 and may be a number in the range of 2 to 150.

Such component (D) is preferably at least one filler which does not have a softening point or does not soften below the softening point of component (A) and may be a component which improves the handling workability of the composition, in addition to imparting mechanical properties and other properties to the cured product of the composition. Component (D) may be inorganic fillers, organic fillers, and mixtures thereof, with inorganic fillers being preferable. As the inorganic filler, a reinforcing filler, a white pigment, a thermally conductive filler, a conductive filler, a phosphor, and a mixture of at least two of these are exemplified, and in order to achieve a filling amount of a high volume %, a reinforcing filler having an average particle diameter of 10.0 µm or more may be preferably contained. The organic filler may be a silicone resin filler, a fluorine resin filler, and a polybutadiene resin filler. The shape of these fillers is not particularly limited and may be spherical, spindle-shaped, flat, needle-shaped, amorphous, or the like.

Component (D) is preferably an inorganic filler having an average particle diameter of 10.0 µm or more, and in particular, since the rate of change in the hardness and a storage modulus at room temperature to high temperatures are small, it is particularly preferable that component (B) be a spherical inorganic filler having an average particle diameter of 10.0 µm or more. In addition, by using an inorganic filler larger than the particle diameter of component (A), the inorganic filler can form good packing at the time of melting, making it possible to greatly reduce the average linear expansion coefficient. Such an inorganic filler can be blended or filled in relatively large amounts with respect to component (A), in addition to there being a practical advantage in that the mechanical strength of the cured product can be further improved. Meanwhile, it is possible and preferable to blend an inorganic filler or an organic filler having an average particle diameter of 5 µm or less for the purpose of imparting or improving the light reflection properties, conductivity, thermal conductivity, fluorescent properties, stress relaxation properties, etc. of the composition of the present invention.

When the present composition is used for applications such as sealants, protective agents, adhesives, light reflecting materials, etc., it is preferable to incorporate a reinforcing filler as component (D) since it imparts mechanical strength to the cured product in addition to improving the protective properties or adhesiveness. Examples of the reinforcing filler include fumed silica, precipitated silica, fused silica, calcined silica, fumed titanium dioxide, quartz, calcium carbonate, diatomaceous earth, aluminum oxide, aluminum hydroxide, zinc oxide, and zinc carbonate. These reinforcing fillers may also be surface-treated with organoalkoxysilanes such as: methyltrimethoxysilane; organohalosilanes such as trimethylchlorosilane; organosilazanes such as hexamethyldisilazane; siloxane oligomers such as $\alpha,\omega$-silanol group-blocked dimethylsiloxane oligomers, $\alpha,\omega$-silanol group-blocked methylphenylsiloxane oligomers, $\alpha,\omega$-silanol group-blocked methylvinylsiloxane oligomers, and the like. Further, as the reinforcing filler, a fibrous filler such as calcium metasilicate, potassium titanate, magnesium sulfate, sepiolite, zonolite, aluminum borate, rock wool, glass fiber, or the like may be used.

In particular, from the viewpoint of imparting the hardness to the cured product at room temperature to high temperatures, component (D) is preferably spherical silica or aluminum oxide (alumina) having an average particle diameter of 10.0 µm or more.

Component (D) may contain silicone microparticles which do not correspond to component (A), and the stress relaxation characteristics and the like thereof can be improved or adjusted as desired. While silicone microparticles include non-reactive silicone resin microparticles and silicone elastomer microparticles, silicone elastomer microparticles are suitably exemplified from the standpoint of improving flexibility or stress relaxation properties.

The silicone elastomer microparticles are a crosslinked product of linear diorganopolysiloxane primarily comprising diorganosiloxy units (D-units). The silicone elastomer microparticles can be prepared by crosslinking reaction of diorganopolysiloxane by hydrosilylation reaction, condensation reaction of a silanol group, or the like, and in particular, the silicone elastomer microparticles can be suitably obtained by crosslinking reaction of organohydrogenpolysiloxane having a silicon-bonded hydrogen atom at a side chain or a terminal and diorganopolysiloxane having an unsaturated hydrocarbon group such as an alkenyl group at a side chain or a terminal, in the presence of a hydrosilylation reaction catalyst. The silicone elastomer microparticles may have various shapes such as spherical, flat, and irregular shapes, but spherical form is preferable in terms of dispersibility, with true spherical being more preferable among these. Commercially available products of such silicone elastomer microparticles (D) include, for example, "TREFIL™-E series" and "EP Powder series" manufactured by Dow Toray Company, Ltd., and "KMP series" manufactured by Shin-Etsu Chemical Co., Ltd. The silicone elastomer microparticles may be surface treated.

When the present composition is used as a wavelength conversion material for an LED, a phosphor may be blended in as component (D) to convert the wavelength of the emission from the optical semiconductor element. There is no particular limitation to such phosphors, with examples thereof including yellow, red, green, and blue light phosphors, which comprise oxide phosphors, oxynitride phosphors, nitride phosphors, sulfide phosphors, oxysulfide phosphors, and the like, that are widely used in light emitting diodes (LED). Examples of the oxide phosphors include: yttrium, aluminum, and garnet-type YAG green to yellow light phosphors containing cerium ions; terbium, aluminum, and garnet-type TAG yellow light phosphors containing cerium ions; and silicate green to yellow light phosphors containing cerium or europium ions. In addition, exemplary oxynitride phosphors include silicon, aluminum, oxygen, and nitrogen type SiAlON red to green light phosphors containing europium ions. Exemplary nitride phosphors include calcium, strontium, aluminum, silicon, and nitrogen type CASN red light phosphors containing europium ions. Exemplary sulfide phosphors include ZnS green light phosphors containing copper ions or aluminum ions. Exemplary oxysulfide phosphors include $Y_2O_2S$ red light phosphors containing europium ions. In the composition, two or more of these phosphors may be used in combination.

In addition, the composition may contain thermally conductive filler or electroconductive filler to impart thermal or electrical conductivity to the cured product. As the thermally conductive filler or the electric conductive filler, exemplified are: metal fine powders such as gold, silver, nickel, copper, aluminum; fine powders obtained by depositing or plating a metal such as gold, silver, nickel, copper or the like on the surface of a fine powder such as ceramic, glass, quartz, organic resin or the like; metal compounds such as aluminum oxide, magnesium oxide, aluminum nitride, boron nitride, zinc oxide, or the like; graphite; and a mixture of two or more of these. When electrical insulation is required for the present composition, a metal oxide-based powder or a metal nitride-based powder is preferable, and in particular, an aluminum oxide powder, a zinc oxide powder, or an aluminum nitride powder is preferable.

While the amount of component (D) must satisfy the volume % range described above, the component may be compounded within the range of from 100 to 4000 parts by mass, within the range of from 250 to 4000 parts by mass, or within the range of from 500 to 4000 parts by mass with respect to 100 parts by mass of component (A).

The present composition may also optionally contain hot-melt microparticles other than component (A), curing retardants and adhesion promoters as other components, as long as the purpose of the present invention is not impaired.

As for hot-melt microparticles other than component (A), one or more types selected from various hot-melt synthetic resins, waxes, fatty acid metal salts, and the like can be used. The wax component exhibits low kinematic viscosity at high temperatures (150° C.) and forms a melt with excellent flowability. In addition, by combining components (A) to (C) described above, the wax component in the melt making up the present composition spreads quickly throughout the composition at high temperatures, thereby lowering the viscosity of the substrate surface to which the molten composition is applied and of the composition as a whole, rapidly lowering the surface friction of the substrate and the molten composition, and significantly increasing the fluidity of the composition as a whole. Therefore, the viscosity and flowability of the molten composition can be greatly improved by adding only a very small amount of a wax component to the total amount of other components.

The wax component may be a petroleum wax such as paraffin as long as it satisfies the conditions of drip point and kinematic viscosity at the time of melting described above; however, in terms of the technical effect of the present invention, a hot-melt component comprising a fatty acid metal salt and a fatty acid ester of an erythritol derivative is preferable, with a metal salt of a higher fatty acid such as stearic acid, palmitic acid, oleic acid, and isononanoic acid, pentaerythritol tetrastearate, dipentaerythritol adipic acid stearic acid ester, glycerine tri-18-hydroxy stearate, and pentaerythritol full stearate being particularly preferable. Here, the types of fatty acid metal salts described above are also not particularly limited, with suitable examples including: alkali metal salts such as lithium, sodium, potassium, and the like; alkaline earth metal salts such as magnesium, calcium, barium, and the like; or zinc salts.

Particularly suitable as the wax component are fatty acid metal salts and erythritol derivatives having a free fatty acid content of 5.0% or less, particularly preferably 4.0% or less, and 0.05 to 3.5%. Examples of such a component include at least one or more stearic acid metal salts and the like. Specifically, the use of a hot-melt component which has a melting point of 150° C. or lower and is selected from calcium stearate (melting point: 150° C.), zinc stearate (melting point: 120° C.), magnesium stearate (melting point: 130° C.), pentaerythritol tetrastearate (melting point: 60 to 70° C.), pentaerythritol adipic acid stearic acid ester (melting point: 55 to 61° C.), pentaerythritol full stearate (melting point: 62 to 67° C.), and the like is most preferable.

The amount of the wax component used, taking the overall composition as 100 mass parts, may be in the range of 0.01 to 5.0 mass parts and may be 0.01 to 3.5 mass parts or 0.01 to 3.0 mass parts. If the amount of the wax component used exceeds the upper limit, the adhesiveness and mechanical strength of the cured product obtained from the cured silicone composition of the present invention may be insufficient. If the amount used is less than the lower limit, sufficient fluidity while heating and melting may not be achieved.

Examples of the curing retardant include: alkyne alcohols such as 2-methyl-3-Butyn-2-ol, 3,5-dimethyl-1-hexyn-3-ol, 2-phenyl-3-butyn-2-ol, and 1-ethynyl-1-cychlohexanol; enyne compounds such as 3-methyl-3-penten-1-yne, and 3,5-dimethyl-3-hexen-1-yne; alkenyl group-containing low molecular weight siloxanes such as tetramethyltetravinylcyclotetrasiloxane and tetramethyltetrahexenylcyclotetrasiloxane; and alkynyloxysilanes such as methyl tris(1,1-dimethyl propynyloxy)silane and vinyl tris(1,1-dimethyl propynyloxy)silane. The amount of the curing retardant is not limited, but is preferably within the range of 10 to 10000 ppm in terms of mass units, relative to the composition.

Furthermore, the composition may optionally contain, as other components, heat resistance agents such as iron oxide (red iron oxide), cerium oxide, cerium dimethyl silanolate, fatty acid cerium salt, cerium hydroxide, zirconium compound, and the like, and also dyes, pigments other than white, flame retardant agents, and the like, as long as the purpose of the present invention is not impaired.

[Linear Expansion Coefficient of the Cured Product]

The cured product obtained by curing the composition has an average linear expansion coefficient in a range of 25° C. to 200° C. to be 20 ppm/° C. or lower, and preferably 15 ppm/° C. or lower. Within this range, because the difference in average linear expansion coefficient between the cured product and the substrate used is low, the residual stress in the obtained integral molded article can be reduced, improving the reliability of the device.

[Bending Strength of the Cured Product]

Furthermore, since it is suitable as a sealant for semiconductors which is required to have high hardness and high strength, the bending strength of the cured product measured by the method specified in JIS K 6911-1995 "Testing Methods for Thermosetting Plastics" is preferably 15 MPa or more, or 20 MPa or more.

[Use of the Present Composition]

The present composition can take the form of granules, pellets, or sheets depending on the manufacturing step thereof. When the composition is to be used in the pellet form, the pellets can be efficiently processed by tableting the granulated present composition. A "pellet" may also be referred to as a "tablet." The shape of the pellet is not limited, but is usually spherical, elliptical spherical, or cylindrical. The size of the pellet is not limited, and for example, has an average particle diameter or a circle equivalent diameter of 500 μm or more.

The present composition may be molded into a sheet and used. For example, a sheet made of a curable silicone composition having an average thickness of 100 to 1,000 μm is advantageous in that it has hot-melt properties and heating-curability at high temperatures and therefore demonstrates particularly excellent workability and melting characteristics when used in compression molding or the like. Such a sheet-like composition may be produced by integrating the curable granular composition obtained by the aforementioned method with a uniaxial or biaxial continuous kneading machine at low temperatures, then making it to a prescribed thickness between two rollers or the like.

[Use as Laminates and Film Adhesives]

The present composition can be used in sheet form, in particular as a laminate, having a structure including a sheet-like member comprising the above described curable silicone composition between two film-like substrates that are equipped with a release layer.

The method for manufacturing such a releasable laminate is not particularly limited, but can be achieved via a method for manufacturing a curable silicone sheet, including:

step 1: a step of mixing each component of the curable silicone composition;

step 2: a step of kneading the mixture obtained in step 1 while heat-melting;

step 3: a step of laminating the mixture (obtained after heating and melting in step 2) between two films, each having at least one release surface; and step 4: a step of extending the laminate obtained in step 3 between rollers to mold a curable silicone sheet having a specific film thickness.

Herein, a roll having a cooling or temperature adjustment function may be used in step 4, etc., and the method may optionally have a step of cutting the laminate including the obtained curable silicone sheet after step 4.

The type of film substrate is not particularly limited, with polyester film, polyolefin film, polycarbonate film, acrylic film, and the like capable of being used as appropriate. The sheet-like substrate is preferably non-porous.

The release layer is necessary for easily peeling off the sheet-like material consisting of the curable silicone composition from the film-like substrate and is sometimes called a release liner, separator, release layer, or release coating layer. Preferably, the release layer can be a silicone release agent, a fluorine release agent, an alkyd release agent, a release layer with a release coating function such as a fluorosilicone release agent and the like, or a substrate itself that is difficult for the adhesive material layer to adhere to, made up of the curing-reactive silicone adhesive composition of the present invention or the cured product thereof or having miniscule physical unevenness on the surface. In particular, in the laminated body of the present invention, a release layer obtained by curing a fluorosilicone-based release agent is preferably used as the release layer.

The laminate described above can be used, for example, by applying the sheet-like member made up of the curable silicone composition to the adherend, followed by peeling off the sheet-like member in an uncured state from the film-like substrate.

Here, the sheet-like member made up of the curable silicone composition has a thickness of 1 mm or less and may be a film-like adhesive. In other words, the laminate may and preferably includes a releasable film adhesive retained by a substrate film. Since the film adhesive has hot-melt properties, it may be used as an adhesive for temporary fixing of semiconductor components, and the like, and may be used as a die attach film.

Moreover, the sheet-like member made up of the curable silicone composition may be molded together with the substrate by compression molding or press molding as is. Here, molding may be performed leaving the film-like substrate on one side, where the film functions as a release film to prevent adhesion to the mold during molding.

The composition of the present invention is non-fluid at 25° C. Here, the term "non-fluid" means that deforming or flowing does not occur in a no-load state and preferably does not deform or flow in a no-load state at 25° C. when molded into a pellet, a tablet, or the like. Such non-fluidity can be evaluated, for example, by placing a molded product of the composition on a hot plate at 25° C. and seeing no substantial deforming or flowing under no load or constant weight occurs. This is because, when non-fluid at 25° C., shape retention at this temperature is good and the surface tackiness is low.

The softening point of the composition is preferably 100° C. or less. Such a softening point means the temperature at which the deformation amount in the height direction is 1 mm or more when the deformation amount of the composition is measured after the load is removed by continuing to press the hot plate with a load of 100 grams for 10 seconds from above.

The present composition tends to decrease in viscosity rapidly under high temperature and high pressure (that is, in the molding step), with values measured at similar high temperatures and high pressures preferably used as a useful melt viscosity value. Therefore, the melt viscosity of the present invention is more preferably measured under high pressure using a Koka-type flow tester (manufactured by the Shimadzu Corporation) than when measured with a rotational viscometer such as a rheometer.

Specifically, the present composition should have a melt viscosity at 150° C. of 200 Pa·s or less, more preferably 150 or less. This is because the adhesiveness to the base material after the composition is hot-melted and then cooled to 25° C. is good.

[Method for Manufacturing the Curable Silicone Composition]

The present composition can be manufactured as a granular composition by powder-mixing components (A) to (D) and other optional components at a temperature lower than the softening point of component (A). The powder mixer used in the present manufacturing method is not limited, with examples including a uniaxial or biaxial continuous mixer, a two-roll mixer, a ROSS mixer, a Hobart mixer, a dental mixer, a planetary mixer, a kneader mixer, a Labo Millser (Osaka Chemical Co.), a small grinder, and a henschel mixer, preferably a Labo Millser, a small grinder, or a henschel mixer.

[Method of Manufacturing the Curable Silicone Sheet]

The curable silicone sheet according to the present invention has hot-melt properties and comprising a curable silicone composition that includes an organopolysiloxane resin, a curing agent, and a functional filler, wherein the manufacturing method of the present invention includes the following steps 1 to 4.

step 1: a step of mixing each component of the curable silicone composition at a temperature of 50° C. or higher;

step 2: a step of kneading the mixture obtained in step 1 while heat-melting;

step 3: a step of laminating the mixture (obtained after heating and melting in step 2) between two films, each having at least one release surface; and step 4: a step of extending the laminate obtained in step 3 between rollers to mold a curable silicone sheet having a specific film thickness.

Here, "having hot-melt properties" refers to a property in which the softening point is within a range of 50° C. to 200° C. and having properties of softening or flowing upon heating. Moreover, regardless of the hot-melt properties of the component of the organopolysiloxane resin microparticles of the curable silicone sheet according to the present invention, it is sufficient if the mixture of the organopolysiloxane resin microparticles, the curing agent, and the functional filler is hot-meltable.

[Step 1]

Step 1 above is a step of mixing a curable granular silicone composition containing an organopolysiloxane resin (suitably in a microparticle form), a curing agent, and a functional filler, which are components of the curable silicone composition. Each of these components is as described above.

The mixture provided by step 1 is a curable granular silicone composition and has hot-melt properties as a mixture as a whole. On the other hand, the mixture is non-fluid at 25° C. Here, the term "non-fluid" means that deforming or flowing does not occur in a no-load state and is preferably does not deform or flow in a no-load state at 25° C. when it is molded into a pellet, a tablet, or the like. Such state of non-fluidity can be evaluated, for example, by placing a molded product of the composition on a hot plate at 25° C. and seeing no substantial deformation or flowing under no load or constant weight occurs. This is because, when non-fluid at 25° C., shape retention at this temperature is good and the surface tackiness is low.

The softening point of the mixture provided by step 1 is 200° C. or lower, preferably 150° C. or lower. Such a softening point means the temperature at which the deformation amount in the height direction is 1 mm or more when the deformation amount of the composition is measured after the load is removed by continuing to press the hot plate with a load of 100 grams for 10 seconds from above.

The softening point of the mixture provided by step 1 is 200° C. or lower. By heating the entire mixture to a temperature of the softening point or more of the mixture in the below-mentioned step 2, the mixture is heat-melted to give a certain level of fluidity. A curable silicone sheet consisting of the curable silicone composition and having hot-melt properties can be obtained by molding the softened material or the melt.

The step of mixing the organopolysiloxane resin, the curing agent, the functional filler, and other optional components is not particularly limited; however, the mixture can be manufactured by mixing the powder materials at a temperature which is less than the softening point of the entire mixture and preferably below that of the organopolysiloxane resin microparticles. The powder mixer used in the present manufacturing method is not limited, with examples including a uniaxial or biaxial continuous mixer, a two-roll mixer, a ROSS mixer, a Hobart mixer, a dental mixer, a planetary mixer, a kneader mixer, a Labo Millser, a small grinder, and a henschel mixer, preferably a Labo Millser, a small grinder, or a henschel mixer.

[Step 2]

Step 2 is a step involving kneading the mixture obtained in step 1 while heat-melting it, wherein the overall composition can be melted or softened by heating and kneading the mixture having hot-melt properties at a temperature of its softening point or higher, suitably within a temperature range of 50° C. and to 200° C., such that the organopolysiloxane resin microparticles, the curing agent, and the functional filler can be uniformly dispersed throughout. If the mixture is press molded into a sheet shape in step 4 via step 3, a uniform thin-layer molded sheet can be formed with a single pressing, with the practical advantage that molding defects or cracking of sheet itself can be avoided. In contrast, if the temperature is less than the above-mentioned lower limit, softening will be insufficient, likely making it difficult to obtain a molten or softened mixture (even upon using mechanical force) in which each component is uniformly dispersed throughout. Even if such a mixture is press molded into a sheet shape in step 4 via step 3, a uniform thin-layer molded sheet cannot be formed, potentially causing breakage or cracking of the sheet. Meanwhile, if the temperature exceeds the above-mentioned upper limit, the curing agent may react during mixing, potentially causing the entire mixture to undergo significant thickening or curing, thereby losing its hot-melt properties and forming a cured product. Therefore, when a hydrosilylation catalyst is used in component (C), a fine particulate platinum-containing hydrosilylation reaction catalyst dispersed or encapsulated with a thermoplastic resin is preferably used.

If the hot-melt viscosity of the mixture obtained in step 1 is low and fluidity is high, the mixture can be laminated on the release film after pre-molding in the below-mentioned step 3, making it preferable. Specifically, if the melt viscosity of the mixture, which is obtained in step 2 after heat-melting, and when determined at 150° C. using a Koka-type flow tester, is within a range of 1 to 1,000 Pas, temporary molding can be carried out in step 3.

In contrast, if the hot-melt viscosity of the mixture obtained in step 1 is high and fluidity is poor, in step 2, the mixture obtained in step 1 may be melted and kneaded at a temperature of its softening point or higher to obtain a uniform composition form, then laminated on the release film in step 3 without carrying out temporary molding.

The mixing apparatus in step 2 is not limited and may be: a batch type heating and kneading apparatus equipped with a heating/cooling function, such as a kneader, a Banbury mixer, a Henschel mixer, a planetary mixer, a 2-roll mill, a 3-roll mill, a Ross mixer, or a labo Plastomill; or a continuous type heating and kneading apparatus equipped with a heating/cooling function such as a single screw extruder or a twin screw extruder, though not particularly limited, and is selected according to the efficiency of the processing time and the ability to control shear heat generation. Considering the processing time, the mixing apparatus may be a continuous heating and kneading apparatus such as a single screw extruder or a twin screw extruder, or may be a batch mixer such as a Labo Plastomill (Toyo Seiki). However, in terms of the production efficiency of the curable silicone sheet, a continuous heating and kneading apparatus such as a single screw extruder or a twin screw extruder is preferably used.

[Step 3]

Step 3 is a step of laminating the mixture (obtained after heat-melting in step 2) between two films each having at least one release surface, and is a preliminary step for press molding in step 4. By forming the laminate in which the mixture obtained in step 2 is sandwiched between films, press molding by rolling extension can be performed from on top of the film to obtain a sheet-like molded article, allowing only the film to be removed from the sheet-like molded article after molding using a release surface.

The mixture obtained after heat-melting in step 2 is laminated between two films. Depending on the form of use of the obtained curable silicone sheet, both films preferably have a release surface, and in step 3, the mixture obtained in step 2 is particularly preferably laminated between the release surfaces of the respective films. Such layered form enables the obtention of a laminated sheet wherein a thin-layer curable silicone sheet is sandwiched between releasable films that can be peeled from both sides via pressure molding in step 4 and optional subsequent cutting, and wherein, at use, the film on both sides can be peeled off to expose only the curable silicone sheet without concern for damaging the formed curable silicone sheet.

While the substrate of the film used in step 3 is not particularly limited, examples thereof include paperboard, cardboard paper, clay-coated paper, polyolefin laminate paper (polyethylene laminate paper, in particular), synthetic resin films/sheets, natural fiber cloth, synthetic fiber cloth, artificial leather cloth, and metal foil. Synthetic resin films and sheets are particularly preferable, with examples of synthetic resins including polyimide, polyethylene, polypropylene, polystyrene, polyvinyl chloride, polyvinylidene chloride, polycarbonate, polyethylene terephthalate, and nylon. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. At the same time, for applications such as a display device in which visibility is required, a transparent substrate and specifically a transparent material such as a polypropylene, polystyrene, polyvinylidene chloride, polycarbonate, polyethylene terephthalate, PEN, or the like is preferable.

The thickness of the film is not particularly limited, but is normally approximately 5 to 300 µm.

The film is preferably provided with at least one release layer, with the release layer preferably in contact with the mixture obtained in step 2. As a result, the hot-melt curable silicone sheet that is pressed and molded via steps 3 and 4 can easily be peeled from the film. The release layer may also be referred to as a release liner, a separator, a release layer, or a release coating layer and may preferably be a release layer having a release coating ability such as a silicone-based release agent, a fluorine-based release agent, an alkyd-based release agent, a fluorosilicone-based release agent, or the like, or may be formed as a substrate itself which is not prone to adhering to the hot-melt curable silicone sheet of the present invention by forming physically fine irregularities in the surface of the substrate.

In step 3, the mixture obtained in step 2 is laminated between two films. The step is not particularly limited; however, the mixture obtained in step 2 is supplied when discharged or applied onto a release layer of one film, while a laminate is formed by pasting together a release layer of the other film from above the mixture. At this time, in the manufacturing step of the continuous curable silicone sheet, each film is transported to the feed position of the mixture of step 2 via a rotary roll, at which time, a lamination operation is performed between the films.

The feed amount of the mixture obtained in step 2 between the films in step 3 can be designed according to the manufacturing speed and scale. As an example, a feed rate of 1 to 10 kg/hr of the mixture obtained in step 2 can be provided between the films; however, needless to say, the present invention is not limited thereto. However, in step 3, the amount of the mixture obtained in step 2 to be laminated between the films must be determined according to the average thickness of the curable silicone sheet designed in step 4, and, the thickness must be such that it is possible to carry out rolling in step 4.

If the hot-melt viscosity of the mixture obtained in step 1 is low and fluidity is high, in step 3, the mixture obtained after heating and melting in step 2 is preferably dispensed while molded into a film shape using a die and laminated between the films. Here, the die is used to temporarily mold the mixture, so the type and the thickness during temporary molding are not particularly limited; however, the composition can be temporarily molded to be generally in sheet shape having a thickness within a range of 100 to 2000 µm (=2 mm) using a T-die, which is preferable.

If the hot-melt viscosity of the mixture obtained in step 1 is low and the fluidity is high, it is preferable to include the step of cooling the entire laminate obtained in step 3 or adjusting the temperature thereof as a step prior to step 4 or in step 4. This is because, when the heat-melted material is cooled into a solid state, the press molding in step 4 is effectively performed. The cooling step is not particularly limited, but can be performed by cooling the mixture (supplied or laminated on the film) within a range of −50° C. to room temperature utilizing cooling rolls, etc. via a cooling means (such as air cooling or a coolant). The details on temperature adjustment are described in step 4.

In contrast, if the hot-melt viscosity of the mixture obtained in step 1 is high and fluidity is poor, the semi-solid mixture may be fed and laminated onto the film without temporary molding in step 3.

[Step 4]

Step 4 is a step in which the laminate obtained in the above-mentioned step 3 is extended between rolls to mold a curable silicone sheet having a specific film thickness, wherein the mixture obtained in step 2 is pressed and extended from on top of the film and molded into the form of a uniform curable silicone sheet.

The rolling process in step 4 can be performed using a known rolling method such as rolling extension on the laminate obtained in step 3. In particular, rolling extension is advantageous in that a curable silicone sheet of a desired thickness can be designed by adjusting the gap between rolls. For example, a curable silicone sheet having excellent flatness and very few defects on the sheet surface and inside the sheet can be obtained by adjusting the gap between the rolls to a constant level in which the average thickness is within a range of 10 to 2000 µm, then rolling. More specifically, for rolling extension, the gap between the rolls is particularly preferably adjusted to be within a range of 1.5 to 4.0-fold the average thickness of the target organopolysiloxane cured film.

Extension can be performed as in step 4 to obtain a substantially flat curable silicone sheet having a thickness of 10 to 2000 µm. By rolling the heat-melted mixture of step 2 in a laminated form between the releasable films in step 3, it is possible to obtain a releasable laminate comprising a curable silicone sheet having hot-melt properties and low defects as well as excellent handling workability due to peeling.

[Temperature Adjustment in Step 4]

In step 4, when the laminate obtained in step 3 is extended between rolls, the rolls preferably further include a temperature adjustment function, and when performing rolling extension, the temperature of the entire laminate is preferably adjusted, and if necessary, heated or cooled. Due to this temperature adjustment, there is a practical advantage in that the gap between the rolls can be stably maintained and the flatness and uniformity (uniformity of film thickness) of the obtained hot-melt curable silicone sheet can be improved. The specific temperature adjustment range can be appropriately designed depending on the heat resistance of the film, the thickness of the curable silicone sheet (design thickness), the reactivity thereof, etc., but is generally within a range of 5 to 150° C.

[Cutting Step]

Step 4 may provide a releasable laminate in which a hot-melt curable silicone sheet is interposed between the releasable films, but may optionally have a step involving cutting a laminate containing the curable silicone sheet. Moreover, the curable silicone sheet may have a step involving winding via a winding apparatus. As a result, a releasable laminate including a hot-melt curable silicone sheet of a desired size can be obtained.

[Laminate]

The laminate obtained by the above-mentioned steps is a laminate configured including an organopolysiloxane resin microparticles, a curing agent, and a functional filler, wherein a curable silicone sheet having substantially flat hot-melt properties with a thickness of 10 to 2000 μm is laminated between films including at least one release surface. Note that the film may be provided together with a release surface, which is preferable.

[Curable Silicone Sheet]

The curable silicone sheet obtained by the manufacturing method of the present invention is a curable silicone composition including an organopolysiloxane resin microparticles, a curing agent, and a functional filler, has hot melt properties, and can be used as a heat meltable adhesive material. In particular, the curable silicone sheet can be used as a die attach film or film adhesive having excellent moldability, gap filling properties, and adhesive strength. Moreover, the sheet can also be suitably used as a curable silicone sheet for compression molding or press molding.

Specifically, the curable silicone sheet obtained via the manufacturing method of the present invention may be peeled from the releasable film, then disposed at a desired site such as a semiconductor. Subsequently, a film adhesive layer that utilizes gap filling properties with respect to irregularities or gaps may be formed on an adherend, followed by being temporarily fixed, disposed, and applied together between the adherends. Further, the curable silicone sheet may be heated to at least 150° C. and adhered between the adherends by the cured product of the curable silicone sheet. Note that the releasable film may be released after heating the curable silicone sheet and forming a cured product, wherein the release timing may be selected according to the application and use method of the curable silicone sheet.

Because the curable silicone sheet has hot-melt properties, it is possible to soften or fluidize the sheet by heating the sheet prior to final curing, and for example, thereby forming the adhesive surface by filling the unevenness or gap without any gap even if there are irregularities on the attached surface of the adherend. Exemplary heating means of the curable silicone sheet include various thermostatic baths, hot plates, electromagnetic heating apparatuses, heating rolls, etc. In order to perform application and heating more efficiently, for example, an electric heat press, a diaphragm type laminator, a roll laminator, etc. are preferably used.

[Method of Molding Cured Product]

The composition can be cured by a method including at least the following steps (I) to (III).

(I) a step of heating to a temperature of 100° C. or higher to melt the present composition;

(II) a step of injecting the curable silicone composition obtained in step (I) into a mold or a step involving distributing the curable silicone composition obtained in step (I) to a mold by clamping; and (III) a step of curing the curable silicone composition injected in step (II).

The composition can be suitably used in a molding method including a coating process in which overmolding and underfilling of a semiconductor device are simultaneously performed (so-called mold underfilling method). Furthermore, due to the characteristics described above, the composition can be suitably used in a molding method including a coating process (so-called wafer molding) in which the surface of a semiconductor wafer substrate on which a single or a plurality of semiconductor devices are mounted is covered and overmolded such that the gaps between the semiconductor devices are filled with the cured product.

In the above steps, a transfer molding machine, a compression molding machine, an injection molding machine, an auxiliary ram molding machine, a slide molding machine, a double ram molding machine, a low pressure sealing molding machine, or the like can be used. In particular, the composition of the present invention can be suitably used for the purpose of obtaining a cured product by transfer molding and compression molding.

Finally, in step (III), the curable silicone composition injected (applied) in step (II) is cured. When an organic peroxide is used as component (C), the heating temperature is preferably 150° C. or higher or 170° C. or higher.

Since it is suitable as a protective member for a semiconductor or the like, the cured product obtained by curing the present composition preferably has a type-D durometer hardness of 20 or more at 25° C. This type-D durometer hardness is determined by the type-D durometer in accordance with the JIS K 6253-1997 "Hardness Testing Methods for Vulcanized Rubber and Thermoplastic Rubber."

[Use of Composition]

The present composition has hot-melt properties, flowability while melted (hot-melt), and superior workability and curability, making it preferable as an encapsulant or underfill material for semiconductors, an encapsulant or underfill material for power semiconductors such as SiC, GaN, and the like, an encapsulant or light reflecting material for optical semiconductors such as light emitting diodes, photodiodes, phototransistors, laser diodes, and the like, or an electrical and electronic adhesive, potting agent, protecting agent, and coating agent. Since the composition has hot-melt properties, it is also suitable as a material for transfer molding, compression molding, or injection molding. In particular, it is suitable for use as an encapsulant for semiconductors that use the mold underfill method or the wafer molding method during molding. Furthermore, a sheet of this composition can be used as a curable film adhesive or as a buffer layer for stress between two substrates with different coefficients of linear expansion.

[Use of Cured Product]

Although the applications of the cured product of the present invention are not particularly limited, the composition of the present invention has hot-melt properties and superior moldability, and its cured product has excellent adhesive properties, high elasticity modulus, and low linear expansion coefficient. Therefore, the cured product obtained by curing the present composition can be suitably used as a member for a semiconductor device, and can be suitably used as a sealant for a semiconductor element, an IC chip or the like, or as a light reflecting material of an optical semiconductor device.

The semiconductor device equipped with a member made of the cured product of the present invention is not particularly limited, but is particularly preferably a semiconductor device mounted on a power semiconductor device or optical semiconductor device.

EXAMPLES

The hot-melt curable silicone composition of the present invention and manufacturing method thereof are described in detail by means of examples and comparative examples.

Note that, in the formulas, Me, Ph, and Vi represent a methyl group, a phenyl group, and a vinyl group, respectively. Moreover, the softening points and melt viscosity of the curable silicone compositions of each example and comparative example were determined by the methods described below. The curable silicone composition was heated at 180° C. for 2 hours to produce a cured product, with the adhesion to various substrates determined by the methods described below. The results are shown in Table 1.

[Softening Point of Curable Silicone Composition]

The curable silicone composition was molded into cylindrical pellets of φ14 mm×22 mm. The pellet was placed on a hot plate set at 25° C. to 100° C. and kept pressed from above for 10 seconds with a load of 100 grams, and after the load was removed, the amount of deformation of the pellet was measured. The temperature at which the deformation amount in the height direction was 1 mm or more was defined as the softening point.

[Melt Viscosity]

The melt viscosity of the curable silicone composition at 180° C. was measured using a nozzle having a diameter of 0.5 mm under 100 kgf of pressure with a CFT-500EX Koka-type flow tester (manufactured by the Shimadzu Corporation).

[Bending Strength of Cured Product]

The curable silicone composition was heated at 180° C. for 2 hours to prepare a cured product. The bending strength of the cured product was determined by the method prescribed in JIS K 6911-1995 "General Testing Method for Thermosetting Plastics".

[Linear Expansion Coefficient Curve of Cured Product]

The curable silicone composition of Example 1 was cured by the method described above to prepare a cured product. The linear expansion coefficient of the cured product was determined by TM9200 manufactured by Advance Riko, Inc. in a temperature range of 20° C. to 200° C.

[Die Shear Strength]

A curable silicone composition was placed at four locations, each approximately 500 mg, on various substrates of 25 mm×75 mm. Next, the composition was covered with a 10 mm square glass chip having a thickness of 1 mm, then heated and cured for two hours under thermocompression bonding using a 1 kg plate at a temperature of 180° C. Thereafter, the mixture was cooled to room temperature and the die shear strength was determined using a shear strength determination apparatus (bond tester SS-100KP, available from Seishin Trading Co., Ltd.)

Organopolysiloxane resins containing a hydrosilylation reaction catalyst were prepared by the methods shown in Reference Examples 1 to 3 below and the hot-melt properties thereof were evaluated by the presence or absence of softening point/melt viscosity. Moreover, the organopolysiloxane resin microparticles were also prepared by the method shown in Reference Example 4. In the reference examples, the 1,1,3,3-tetramethyl-1,3-divinyl disiloxane used for the platinum complex that is the hydrosilylation reaction catalyst is described as "1,3-divinyltetramethyldisiloxane".

Reference Example 1

A toluene solution of a resinous organopolysiloxane (1) containing 10 ppm of platinum metal in mass units was prepared by injecting 270.5 g of a 55 mass % toluene solution of a resinous organopolysiloxane represented by the average unit formula:

$(PhSiO_{3/2})_{0.80}(Me_2ViSiO_{1/2})_{0.20}$, which is a white solid at 25° C., along with 0.034 g of a 1,3-divinyltetramethyldisiloxane solution of platinum 1,3-divinyltetramethyldisiloxane complex (platinum metal content=approximately 4000 ppm) into a 1 L flask and stirring uniformly at room temperature (25° C.). The softening point of this resinous organopolysiloxane (1) was 100° C., with a melt viscosity determined at 150° C. using a rotary viscometer was 30 Pa·s.

Reference Example 2

A toluene solution of a resinous organopolysiloxane (2) containing 10 ppm of platinum metal in mass units was prepared by injecting 270.5 g of a 55 mass % toluene solution of a resinous organopolysiloxane represented by the average unit formula:

$(PhSiO_{3/2})_{0.80}(Me_2ViSiO_{1/2})_{0.20}$, which is a white solid at 25° C., 21.3 g of a diphenylsiloxane capped at both molecular terminals with dimethylhydrogensiloxy groups and having a viscosity of 5 mPa·s (silicon-atom bonded hydrogen atom content=0.6 mass %) represented by the formula:

$HMe_2SiO(Ph_2SiO)SiMe_2H$, (in an amount such that the amount of silicon atom-bonded hydrogen atoms in this component is 0.5 mol relative to 1 mol of vinyl groups in the resinous organopolysiloxane), along with 0.034 g of a 1,3-divinyltetramethyldisiloxane solution of platinum 1,3-divinyltetramethyldisiloxane complex (platinum metal content=approximately 4000 ppm) (in an amount such that the amount of platinum metal is 10 ppm in mass units with respect to this liquid mixture) into a 1 L flask and stirring uniformly at room temperature. Thereafter, the temperature in the flask was raised to 100° C. using an oil bath and the mixture was stirred under a reflux of toluene for 2 hours to prepare a toluene solution of an organosiloxane crosslinked product (2) containing a resinous organopolysiloxane derived from the above-mentioned resinous organopolysiloxane and a chained organosiloxane derived from the above-mentioned diphenylsiloxane and having a vinyl group not involved in the above-mentioned reaction. Note that when the organosiloxane crosslinked product (2) was analyzed by FT-IR, peaks of silicon atom-bonded hydrogen atom were not observed. Moreover, the softening point of this organosiloxane crosslinked product (2) was 75° C., while the melt viscosity thereof at 100° C. was 700 Pa·s.

Reference Example 3

Hot-Meltable Organopolysiloxane Resin Microparticles (1)

True-spherical hot-melt silicone microparticles (1) were prepared by atomizing the toluene solution of the organosiloxane crosslinked product (1) prepared in Reference Example 1 by spray drying at 40° C. while removing toluene. Observation of the microparticles with an optical microscope revealed that the particle diameter was 5 to 10 μm and the average particle diameter was 7.9 μm.

Reference Example 4

Hot-Meltable Organopolysiloxane Resin Microparticles (2)

True-spherical hot-melt silicone microparticles (2) were prepared by atomizing the toluene solution of the organosiloxane crosslinked product (2) prepared in Reference Example 2 by spray drying at 40° C. while removing toluene. Observation of the microparticles with an optical microscope revealed that the particle diameter was 5 to 10 µm and the average particle diameter was 7.5 µm.

Example 1

First, 1900.0 g of fused silica having an average particle diameter of 17 µm (S6050P manufactured by Nippon Steel Materials, Inc.) and 9.5 g of dimethylpolysiloxane having a viscosity of 23 mPa·s represented by the formula:

Me$_2$ViSiO(Me$_2$SiO)$_{29}$Si(OMe)$_3$ were placed as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and Formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1),
8.1 g of bis(trimethoxysilyl propoxymethyl)vinyl silatrane, and
1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

Example 2

First, 1900.0 g of fused silica having an average particle diameter of 17 µm (S6050P manufactured by Nippon Steel Materials, Inc.) and 9.5 g of dimethylpolysiloxane having a viscosity of 23 mPa·s represented by the formula:

Me$_2$ViSiO(Me$_2$SiO)$_{29}$Si(OMe)$_3$ were placed as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and represented by Formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1),
8.1 g of bis(trimethoxysilyl propoxymethyl)allyl silatrane, and
1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

Example 3

First, 1900.0 g of fused silica having an average particle diameter of 17 µm (S6050P manufactured by Nippon Steel Materials, Inc.) and 9.5 g of dimethylpolysiloxane having a viscosity of 23 mPa·s represented by the formula:

Me$_2$ViSiO(Me$_2$SiO)$_{29}$Si(OMe)$_3$ were injected as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %) and represented by Formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1), and
8.1 g of a carbasilatrane derivative represented by the following structural formula:

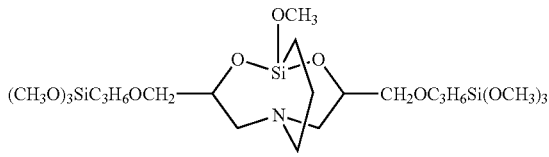

as well as 1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

Example 4

First, 1700.0 g of fused silica having an average particle diameter of 14.5 µm (S610-5P manufactured by Nippon Steel Materials, Inc.) and 9.5 g of dimethylpolysiloxane having a viscosity of 125 mPa·s represented by the formula:

Me$_3$SiO(Me$_2$SiO)$_{110}$Si(OMe)$_3$ were placed as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and represented by Formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1), 8.0 g of bis(trimethoxysilyl propoxymethyl)vinyl silatrane, and 1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

Example 5

First, 1700.0 g of fused silica having an average particle diameter of 14.5 µm (S610-5P manufactured by Nippon Steel Materials, Inc.) and 9.5 g of dimethylpolysiloxane having a viscosity of 125 mPa·s represented by the formula:

Me$_3$SiO(Me$_2$SiO)$_{110}$Si(OMe)$_3$ were placed as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and represented by Formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1), 8.0 g of bis(trimethoxysilyl propoxymethyl)allyl silatrane, and 1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

Example 6

First, 1900.0 g of fused silica having an average particle diameter of 17 µm (SP-6050P manufactured by Nippon Steel Materials, Inc.) and 9.5 g of dimethylpolysiloxane having a viscosity of 23 mPa·s represented by the formula:

Me$_2$ViSiO(Me$_2$SiO)$_{29}$Si(OMe)$_3$ were placed as a single batch into a small pulverizer and stirred for 1 minute and repeated 5 times at 150° C., then, once the fused silica was surface-treated, the temperature of the pulverizer was returned to 25° C.

Next, 74.1 g of hot-melt silicone microparticles (2), 11.1 g of diphenylsiloxane capped at both molecular terminals with dimethylhydrogensiloxy groups and having a viscosity of 5 mPa·s (silicon atom-bonded hydrogen atom content=0.6 mass %) represented by the formula:

HMe$_2$SiO(Ph$_2$SiO)SiMe$_2$H, and 14.8 g of a methylphenylpolysiloxane capped at both molecular terminals with dimethylvinylsiloxy groups and having a viscosity of 1,000 Pa·s (vinyl group content=2.1 mass %) represented by the average formula Me$_2$ViSiO(MePhSiO)$_{17.5}$SiMe$_2$Vi, which is an amount where the silicon atom-bonded hydrogen atoms in the diphenylsiloxane is 1.0 mol relative to 1 mol of vinyl groups in the silicone microparticles (1) and the methylphenylpolysiloxane capped at both molecular terminals with dimethylvinylsiloxy groups, 8.1 g of bis(trimethoxysilyl propoxymethyl)vinyl silatrane, and 1-ethynyl-1-cyclohexanol (an amount of 300 ppm in mass units relative to this composition) was batch fed into a small grinder and stirred for 1 minute at room temperature (25° C.) to prepare a uniform white curable silicone composition. The measurement results of the softening point and other properties of this composition are shown in Table 1.

Comparative Example 1

First, 1900.0 g of fused silica having an average particle diameter of 17 µm (S6050P manufactured by Nippon Steel Materials, Inc.) and 9.5 g of dimethylpolysiloxane having a viscosity of 23 mPa·s represented by the formula:

Me$_2$ViSiO(Me$_2$SiO)$_{29}$Si(OMe)$_3$ were placed as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and Formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1), 8.1 g of a condensation reaction product of 3-glycidoxypropyl trimethoxysilane and methylvinyl siloxane oligomer blocked by a silanol group at both terminals of a molecular chain with a viscosity of 30 mPa·s at 25° C., and 1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

Comparative Example 2

First, 1900.0 g of fused silica having an average particle diameter of 17 μm (S6050P manufactured by Nippon Steel Materials, Inc.) and 9.5 g of dimethylpolysiloxane having a viscosity of 23 mPa·s represented by the formula:

Me$_2$ViSiO(Me$_2$SiO)$_{29}$Si(OMe)$_3$ were placed as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and represented by the formula:

HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1), and 8.1 g of an epoxy group-containing polysiloxane:

(Me$_2$ViSiO$_{1/2}$)$_{0.2}$(MeEpSiO$_{2/2}$)$_{0.25}$(PhSiO$_{3/2}$)$_{0.55}$(HO$_{1/2}$)$_{0.005}$ as well as 1-ethynyl-1-cyclohexanol (an amount of 300 ppm in mass units relative to this composition) were additionally fed into a small grinder and stirred for 1 minute at room temperature (25° C.) to prepare a uniform granular white curable silicone composition. The measurement results of the softening point and other properties of this composition are shown in Table 1.

Comparative Example 3

First, 1900.0 g of fused silica having an average particle diameter of 17 μm (S6050P manufactured by Nippon Steel Materials, Inc.) and 9.5 g of dimethylpolysiloxane having a viscosity of 23 mPa·s represented by the formula:

Me$_2$ViSiO(Me$_2$SiO)$_{29}$Si(OMe)$_3$ were injected as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and represented by Formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1), 8.1 g of 3-glycidoxypropyltrimethoxysilane, and 1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

Comparative Example 4

First, 1700.0 g of fused silica having an average particle diameter of 14.5 μm (S610-5P manufactured by Nippon Steel Materials, Inc.) and 9.5 g of dimethylpolysiloxane having a viscosity of 125 mPa·s represented by the formula:

Me$_3$SiO(Me$_2$SiO)$_{110}$Si(OMe)$_3$ were placed as a single batch into a small pulverizer and stirred for 1 minute at 150° C., then, once the fused silica was surface-treated, the temperature of the pulverizer was returned to 25° C. Next, 78.7 g of hot-melt silicone microparticles (1), 9.1 g of diphenylsiloxane capped at both molecular terminals with dimethylhydrogensiloxy groups having a viscosity of 5 mPa·s (silicon atom-bonded hydrogen atom content=0.6 mass %), and represented by the formula: HMe$_2$SiO(Ph$_2$SiO)SiMe$_2$H, 12.2 g of a branched-chain organopolysiloxane having two or more silicon atom-bonded hydrogen atoms in each molecule and having a viscosity of 25 mPa·s (silicon atom-bonded hydrogen atom content=0.65 mass %) represented by Average unit formula:

(PhSiO$_{3/2}$)$_{0.4}$(HMe$_2$SiO$_{1/2}$)$_{0.6}$, which is an amount where the silicon atom-bonded hydrogen atoms in the diphenylsiloxane and branched chain phenylsiloxane is 1.0 mol relative to 1.0 mol of vinyl groups in the silicone microparticles (1), 8.1 g of N-phenyl-3-aminopropyltrimethoxysilane, and 1-ethynyl-1-cyclohexanol (an amount of 300 ppm in mass units relative to this composition) were additionally fed into the small pulverizer and stirred for 1 minute at room temperature (25° C.) to prepare a uniform granular white curable silicone composition. The measurement results of the softening point and other properties of this composition are shown in Table 1.

TABLE 1

|  | Examples | | | | | |
| --- | --- | --- | --- | --- | --- | --- |
|  | 1 | 2 | 3 | 4 | 5 | 6 |
| Softening temperature [° C.] | 100 | 100 | 85 | 90 | 90 | 85 |
| Melt viscosity [Pas] | 65 | 70 | 65 | 75 | 80 | 150 |
| Die shear strength To Al [MPa] | 9.3 | 10.1 | 8.5 | 9.1 | 9.6 | 5.3 |
| To Ni [MPa] | 8.3 | 9.5 | 7.1 | 7.9 | 8.3 | 5.1 |
| To Au [MPa] | 7.9 | 9.1 | 6.5 | 8.0 | 8.5 | 5.2 |
| To epoxy glass [MPa] | 9.1 | 10.2 | 8.6 | 8.5 | 8.8 | 5.2 |
| CTE [ppm/° C.] | 12 | 11 | 12 | 13 | 14 | 12 |
| Bending strength [MPa] | 46 | 51 | 43 | 48 | 49 | 52 |

|  | Comparative Examples | | | |
| --- | --- | --- | --- | --- |
|  | 1 | 2 | 3 | 4 |
| Softening temperature [° C.] | 100 | 100 | 110 | 110 |
| Melt viscosity [Pas] | 70 | 85 | 250 | 190 |
| Die shear strength To Al [MPa] | 7.5 | 7.9 | 8.9 | 8.1 |
| To Ni [MPa] | 0 | 0 | 4.2 | 3.7 |
| To Au [MPa] | 0 | 0 | 3.1 | 3.3 |
| To epoxy glass [MPa] | 2.1 | 1.4 | 4.3 | 3.2 |
| CTE [ppm/° C.] | 11 | 12 | 10 | 14 |
| Bending strength [MPa] | 49 | 50 | 37 | 35 |

SUMMARY

The curable silicone composition of Practical Example 1 to 6 according to the present invention had good hot-melt properties, strongly adhered to any substrate, and had a sufficient linear expansion coefficient (CTE) and bending strength sufficient for practical use. Therefore, it is expected that the cured products obtained using these curable silicone compositions can be suitably used in sealing semiconductor devices in which gold, epoxy glass, etc. are often used.

In contrast, Comparative Examples 1 to 4, which did not satisfy the compositional requirements of the present invention, exhibited good adhesion to aluminum, but did not strongly adhere to nickel, gold, and epoxy glass, which are relatively adhesion-poor substrates. Moreover, when a silane compound other than a silatrane derivative such as that in Comparative Examples 3 and 4 was used, the melt characteristics as well as the strength of the cured product deteriorated. This is considered to be the result of the adhesion promoter in Comparative Examples 3 and 4 adversely affecting the surface treatment of the functional filler.

Manufacturing Example 1

The granular curable silicone composition, such as Example 1 above, was heated to 80° C., heat-melted and mixed using a twin-screw extruder, and kneaded into the form of a semi-solid softened material, then fed onto a releasable film (Biwa liner manufactured by Takara Inc.) at a feed rate of 5 kg/hour and laminated between the two releasable films. The laminate was then extended between rolls to form a laminate in which a hot-melt curable silicone sheet having a thickness of 500 μm is laminated between two releasable films, after which the entire laminate was cooled by a cooling roll set at −15° C. In this laminate, a flat and homogeneous hot-melt curable silicone sheet was obtained by separating the releasable film.

Manufacturing Example 2

The granular curable silicone compositions of Example 1 and the like described above were heated to 80° C., heat-melted and mixed using a twin-screw extruder, and formed into a sheet shape using a T-type die (opening dimensions: 800 μm×100 mm, heated to 80° C.), then fed onto a releasable film (Biwa liner manufactured by Takara Inc.) at a supply speed of 5 kg/hr. The entire sheet was cooled by a cooling roll set at −15° C., then laminated between the two releasable films. The laminate was then extended between rolls to form a laminate in which a hot-melt curable silicone sheet having a thickness of 500 μm is laminated between two releasable films. In said laminate, a flat and homogeneous hot-melt curable silicone sheet was obtained by separating the releasable film.

21. The curable silicone composition according to claim 1, wherein component (B) is the following silatrane derivative:
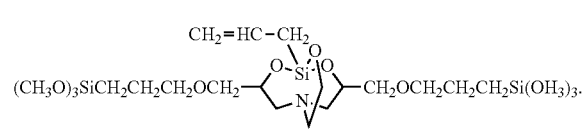

The invention claimed is:

1. A curable silicone composition that is solid at 25° C. and has hot-melt properties at a temperature of 200° C. or lower, comprising:

(A) organopolysiloxane resin microparticles where 20 mol % or more of all siloxane units is siloxane units represented by $RSiO_{3/2}$ where R is a monovalent hydrocarbon group;

(B) an adhesion promoter agent;

(C) a curing agent; and (D) functional inorganic filler;

wherein the content of component (D) is 80 to 95% by volume relative to the overall composition; and wherein component (B) is selected from the following silatrane derivatives:

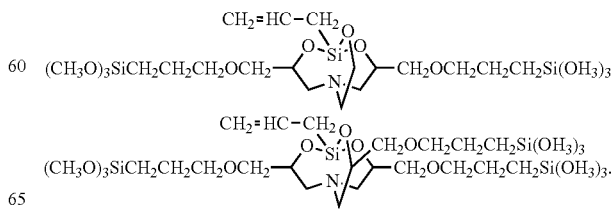

2. The curable silicone composition according to claim 1, wherein at least part or all of component (A) is (A1) hot-melt organopolysiloxane resin microparticles which have a softening point of 30° C. or higher, have at least one curing reactive functional group containing a carbon-carbon double bond per molecule, and where 20 mol % or more of all siloxane units is siloxane units represented by $RSiO_{3/2}$ where R is a monovalent hydrocarbon group.

3. The curable silicone composition according to claim 1, wherein:
the content of component (B) is within a range of 0.1 to 1.0 mass % relative to the overall composition.

4. The curable silicone composition according to claim 1, wherein curing thereof provides a cured product having:
i) an average linear expansion coefficient of 20 ppm/° C. or less within a range of 25° C. to 200° C.;
ii) a bending strength of 15 MPa or more as determined by the method prescribed in JIS K 6911-1995; or
iii) both i) and ii).

5. The curable silicone composition according to claim 1, wherein at least some or all of component (A) is (A1-1) hot-melt organopolysiloxane resin microparticles which have a softening point of 30° C. or higher, have at least one curing reactive functional group containing a carbon-carbon double bond per molecule, and where 20 mol % or more of all siloxane units is siloxane units represented by $RSiO_{3/2}$ where R is a monovalent hydrocarbon group, and wherein 10 mol % or more of the silicon atom-bonded organic groups are aryl groups.

6. The curable silicone composition according to claim 1, wherein component (A) is spherical resin microparticles having an average primary particle diameter of 1 to 10 μm.

7. The curable composition according to claim 1, wherein component (C) is one or more curing agents selected from (c1) or (c2) below, in an amount necessary to cure the composition:
(c1) an organic peroxide;
(c2) an organohydrogenpolysiloxane having at least two silicon atom-bonded hydrogen atoms per molecule and a hydrosilylation reaction catalyst.

8. The curable silicone composition according to claim 1, wherein component (D) is selected from the group consisting of a reinforcing filler, a white pigment, a thermally conductive filler, an electrically conductive filler, a phosphor, and a mixture of at least two of these.

9. The curable silicone composition according to claim 8, wherein component (D) has an average particle diameter of 10.0 μm or more.

10. The curable silicone composition according to claim 8, wherein component (D) is surface-treated with an organopolysiloxane represented by the following structural formula:

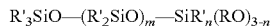

where R is an alkyl group having 1 to 3 carbon atoms, each R' is independently an alkyl group having 1 to 20 carbon atoms, a halogen-substituted alkyl group having 1 to 20 carbon atoms, an alkenyl group having 2 to 20 carbon atoms, an aryl group having 6 to 20 carbon atoms, a halogen-substituted aryl group having 6 to 20 carbon atoms, or an aralkyl group having 7 to 20 carbon atoms, provided at least one terminal R' is an alkenyl group, n is a number in the range of 0 to 2, while m is a number in the range of 2 to 150.

11. The curable silicone composition according to claim 1, in a granule, a pellet, or a sheet form.

12. A method for molding a cured product, comprising the following steps:
(I) heating the curable silicone composition in the form of pellets or sheets according to claim 11 to a temperature of 100° C. or higher to melt;
(II) injecting the curable silicone composition in a liquid state obtained in step (I) into a mold or distributing the curable silicone composition obtained in the step (I) to a mold by clamping; and
(III) curing the curable silicone composition injected or distributed in step (II).

13. A substantially flat, 10 to 1,000 μm thick, curable silicone composition sheet formed from the curable silicone composition according to claim 1.

14. A film-like adhesive, comprising the curable silicone composition sheet according to claim 13.

15. A releasable laminate, comprising:
the curable silicone composition sheet according to claim 13; and
a sheet-like substrate with a release surface facing the curable silicone composition sheet on one or both surfaces of the curable silicone composition sheet.

16. A method for manufacturing the curable silicone composition sheet according to claim 13, comprising the followings steps:
1) mixing raw material components of the curable silicone composition at a temperature of 50° C. or higher;
2) kneading a mixture obtained in step 1) while heating and melting;
3) laminating a heated and melted mixture obtained in step 2) between films provided with at least one release surface; and
4) extending a laminate body obtained in step 3) between rollers to mold a curable silicone sheet having a specific film thickness.

17. A cured product obtained by curing the curable silicone composition according to claim 1.

18. A semiconductor device or a member for a semiconductor device, the semiconductor device or member thereof comprising the cured product according to claim 17.

19. A method for manufacturing the curable silicone composition according to claim 1, wherein each component that makes up the curable silicone composition is granulated by mixing under temperature conditions not exceeding 50° C.

20. A method for molding a cured product, comprising a coating process for overmolding and underfilling a semiconductor device using a cured product formed from the curable silicone composition according to claim 1; optionally, the method comprising:
covering a surface of a semiconductor wafer substrate on which a single or plurality of semiconductor devices are mounted with a cured product produced by curing the curable silicone composition; and
overmolding so that a gap between the semiconductor devices is filled with the cured product.